(12) United States Patent
Fukai et al.

(10) Patent No.: US 7,491,477 B2
(45) Date of Patent: Feb. 17, 2009

(54) COLOR FILTER AND MANUFACTURING METHOD THEREOF, AND ELECTRONIC APPLIANCE HAVING THE COLOR FILTER

(75) Inventors: Shuji Fukai, Kanagawa (JP); Kanako Kunizaki, Kanagawa (JP)

(73) Assignee: Semiconductor Energy Laboratory Co., Ltd., Kanagawa-Ken (JP)

( * ) Notice: Subject to any disclaimer, the term of this patent is extended or adjusted under 35 U.S.C. 154(b) by 0 days.

(21) Appl. No.: 11/971,071

(22) Filed: Jan. 8, 2008

(65) Prior Publication Data

US 2008/0180629 A1 Jul. 31, 2008

(30) Foreign Application Priority Data

Jan. 29, 2007 (JP) ............................. 2007-017952

(51) Int. Cl.
*G02B 5/20* (2006.01)

(52) U.S. Cl. ............................. 430/7; 430/945; 349/192

(58) Field of Classification Search ........................ None
See application file for complete search history.

(56) References Cited

U.S. PATENT DOCUMENTS

| 5,246,804 | A | * | 9/1993 | Furukawa et al. ............. 430/20 |
| 5,531,881 | A | | 7/1996 | Matsumura et al. |
| 6,035,526 | A | * | 3/2000 | Saruta et al. ................. 29/846 |
| 6,812,992 | B2 | | 11/2004 | Nemeth |
| 6,828,069 | B1 | | 12/2004 | Nakazawa et al. |
| 7,288,346 | B2 | | 10/2007 | Kobayashi et al. |
| 2007/0081105 | A1 | * | 4/2007 | Park et al. ..................... 349/22 |

FOREIGN PATENT DOCUMENTS

| JP | 59-075205 | | 4/1984 |
| JP | 03-274504 | | 12/1991 |
| JP | 2002-341304 A | * | 11/2002 |
| JP | 2006-098760 | | 4/2006 |
| JP | 2006-162882 | | 6/2006 |
| WO | WO 99/13364 | * | 3/1999 |

* cited by examiner

*Primary Examiner*—John A. McPherson
(74) *Attorney, Agent, or Firm*—Nixon Peabody LLP; Jeffrey L. Costellia

(57) ABSTRACT

The present invention provides a method for manufacturing a color filter to facilitate the correction of the defect which is caused by the undesirable mixing of plural color filter materials with different color. Further, the present invention provides a color filter manufactured by the present method for manufacturing the color filter and also a semiconductor device using the color filter manufactured by the present method. In the manufacturing method of the present invention, the color-mixed portion which is undesirably formed during the production of the color-filter by using a plurality of color filter materials is irradiated with a laser beam which is different in transmissivity to each color filter material. This method allows the color filter material which is necessary to remain and the color filter material which is unnecessary to be selectively removed.

32 Claims, 9 Drawing Sheets

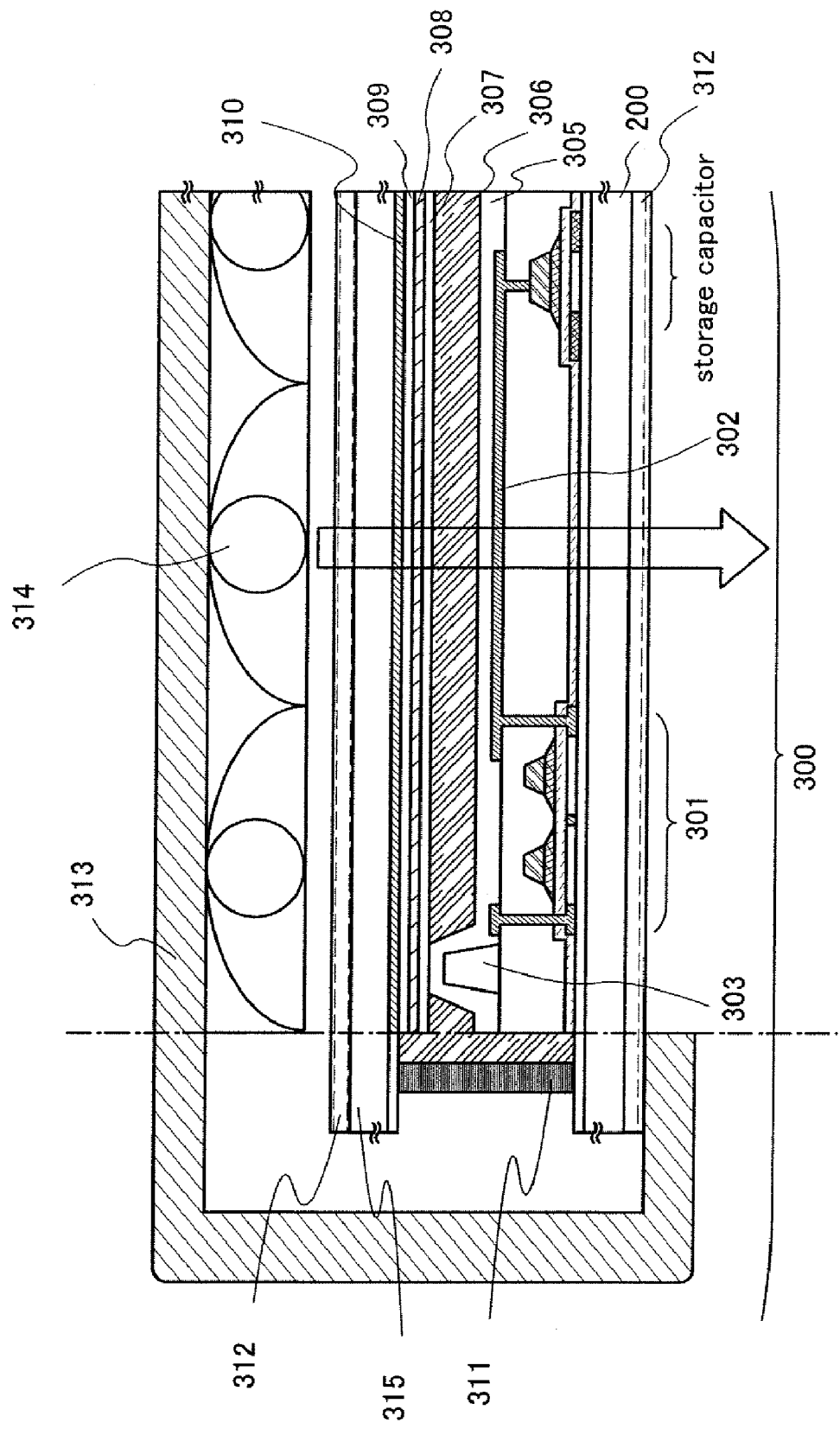

terminal portion | pixel portion

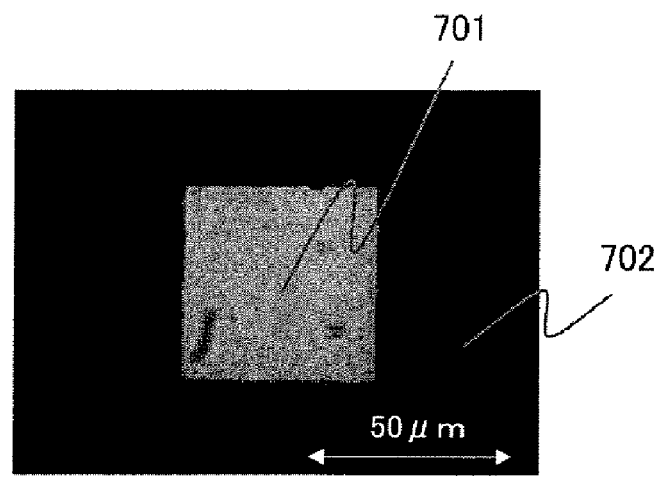
Red (R) over Green (G)
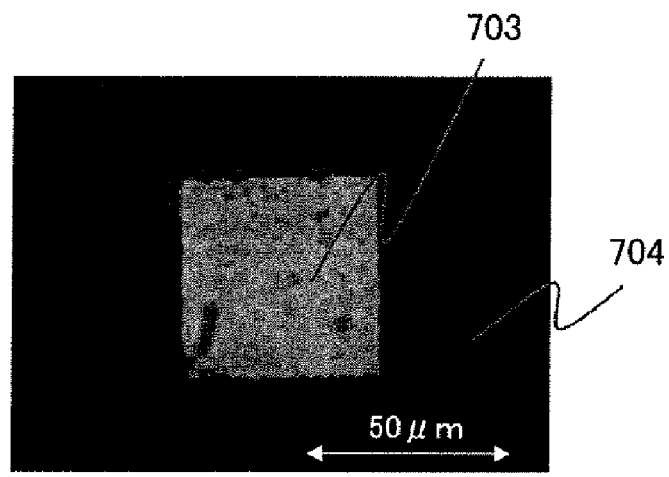
Blue (B) over Green (G)
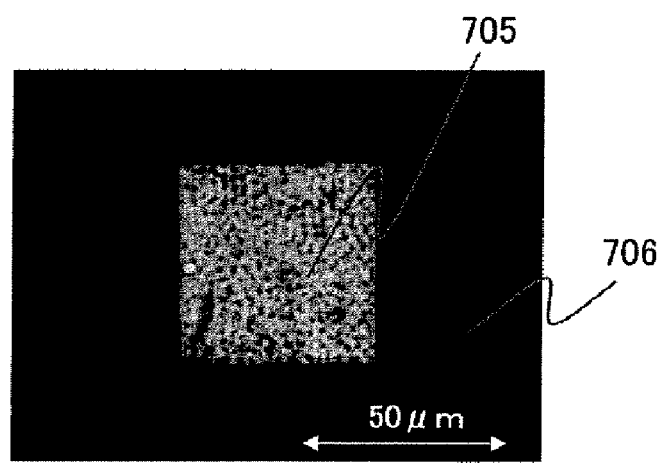
Red (R) over Blue (B)

COLOR FILTER AND MANUFACTURING METHOD THEREOF, AND ELECTRONIC APPLIANCE HAVING THE COLOR FILTER

BACKGROUND OF THE INVENTION

1. Field of the Invention

The present invention relates to a method for manufacturing a color filter which is used for a display panel. Further, the present invention relates to a color filter which is manufactured by the above-described manufacturing method and an electronic appliance having the color filter.

2. Description of the Related Art

In recent years, demand of a display, especially, a color display has tended to increase due to the development of personal computers and the like. In the color display such as a liquid crystal display panel, the color filter for full color display is formed on a counter substrate. Polarizing plates are provided as a light shutter to an element substrate and the counter substrate, so that a full color image is displayed.

Here, the color filter of the liquid crystal display panel has colored layers of R (Red), G (Green) and B (Blue) and light-shielding partition walls (black matrixes) which are arranged in spaces between pixels. Light is transmitted through the colored layers to extract red light, green light and blue light. The partition walls (i.e. bank) of the color filter are generally formed with a metal film or an organic film containing black pigment. Each colored layer of this color filter is formed in a position corresponding to each pixel (hereinafter, referred to as a pixel region), whereby a color of light extracted from each pixel can be changed. Note that the position corresponding to the pixel refers to a position overlapping a pixel electrode.

An EL (electroluminescence) display device has three coloring methods. One is the arrangement of red, green, and blue emissive EL elements in matrix. A second method is the transmission of light emitted from a blue emissive EL element through a color conversion layer. The other is the use of the color filter in which coloring is performed by transmitting light emitted from a white emissive EL element through the color filter. The coloring method in which light emitted from the white emissive EL element is transmitted through the color filter is similar in principle to a coloring method of a liquid crystal display device using the color filter.

As a method for manufacturing such a color filter, a method has been investigated in which the colored layers corresponding to R (Red), G (Green) and B (Blue) are formed by an ink-jet method (see Patent Document 1: Japanese Published Patent Application No. S59-75205). Because a very high-resolution patterning of each colored layer is required for the color filter, the partition walls are provided onto the substrate to prevent color mixing between different pixel regions when the ink-jet method is applied. However, there has been a problem in that color filter materials frequently overflows the partition wall to result in the color mixing of the color filter materials. Therefore, as a correcting method of color mixing of the color filter, a correcting method with the use of a laser beam has been proposed (see Patent Document 2: Japanese Published Patent Application No. H3-274504). In addition, a method for preventing color mixing has been proposed in which wettability is controlled by surface treatment to avoid the spread of the color filter material to a different pixel region (see Patent Document 3: Japanese Published Patent Application No. 2006-162882).

SUMMARY OF THE INVENTION

However, even when the above measures are applied, color mixing of the color filter materials occurs in some cases, which leads to generation of a defect. A conventional correcting method with the use of a laser beam is extremely inefficient because all the color filter materials in the pixel where a defect occurs are removed by irradiation with a laser beam, and a color filter material needs to be filled again in the pixel where all the color filter materials are removed. Further, in a case of filling again the pixel where all the color filter materials are removed with the color filter material, each pixel is manually filled with the color filter material; therefore, there is a problem in that correcting work is very troublesome.

The present invention has been made in view of the above problems, and it is a first object of the present invention to provide a method for manufacturing a color filter of which defect can be easily corrected.

It is a second object of the present invention to provide a color filter manufactured by the above-described method for manufacturing the color filter and a semiconductor device using the color filter.

In a method for manufacturing the color filter of the present invention, color mixing which occurs in forming the color filter by an ink-jet method is corrected by using difference in transmissivity of each laser beam to color filter materials.

The method for manufacturing the color filter of the present invention includes a step of manufacturing the color filter in which colored layers are formed over a light-transmitting substrate. In that case, a color mixing occurs when colored layers are formed. The color-mixed portion is irradiated with a laser beam of which transmissivity to the color filter material which is to be left is higher than that to the color filter material which is to be removed by greater than or equal to 10%, so that the color filter material which is necessary in the color mixed portion remains, and the color filter material which is unnecessary therein is selectively removed.

The method for manufacturing the color filter of the present invention includes a step of dropping at least a first color filter material and a second color filter material over a light-transmitting substrate to manufacture the color filter in which a plurality of colored layers are formed. In that case, a color mixing occurs where the second color filter material is dropped over the first color filter material. The color-mixed portion is irradiated with a laser beam with a wavelength of which transmissivity to the first color filter material is higher than that to the second color filter material by greater than or equal to 10%, so that the second color filter material is selectively removed.

The method for manufacturing the color filter of the present invention includes a step of manufacturing the color filter in which colored layers are formed over a light-transmitting substrate. In that case, a color mixing occurs where a color filter material to transmit blue light overlaps the colored layer filled with a color filter material to transmit green light. The color-mixed portion is irradiated with a laser beam in a wavelength region of greater than or equal to 515 nm and less than or equal to 600 nm, so that the color filter material to transmit blue light is selectively removed.

The method for manufacturing the color filter of the present invention includes a step of manufacturing the color filter in which colored layers are formed over a light-transmitting substrate. In that case, a color mixing occurs where a color filter material to transmit red light overlaps the colored layer filled with a color filter material to transmit green light. The color-mixed portion is irradiated with a laser beam in a wavelength region of greater than or equal to 470 nm and less than or equal to 585 nm, so that the color filter material to transmit red light is selectively removed.

The method for manufacturing the color filter of the present invention includes a step of manufacturing the color filter in which colored layers are formed over a light-transmitting substrate. In that case, a color mixing occurs where a color filter material to transmit green light overlaps the colored layer filled with a color filter material to transmit red light. The color-mixed portion is irradiated with a laser beam in a wavelength region of greater than or equal to 595 nm and less than or equal to 700 nm, so that the color filter material to transmit green light is selectively removed.

The method for manufacturing the color filter of the present invention includes a step of manufacturing the color filter in which colored layers are formed over a light-transmitting substrate. In that case, a color mixing occurs where a color filter material to transmit blue light overlaps the colored layer filled with a color filter material to transmit red light. The color-mixed portion is irradiated with a laser beam in a wavelength region of greater than or equal to 580 nm and less than or equal to 700 nm, so that the color filter material to transmit blue light is selectively removed.

The method for manufacturing the color filter of the present invention includes a step of manufacturing the color filter in which colored layers are formed over a light-transmitting substrate. In that case, a color mixing occurs where a color filter material to transmit green light overlaps the colored layer filled with a color filter material to transmit blue light. The color-mixed portion is irradiated with a laser beam in a wavelength region of greater than or equal to 400 nm and less than or equal to 500 nm, so that the color filter material to transmit green light is selectively removed.

The method for manufacturing the color filter of the present invention includes a step of manufacturing the color filter in which colored layers are formed over a light-transmitting substrate. In that case, a color mixing occurs where a color filter material to transmit red light overlaps the colored layer filled with a color filter material to transmit blue light. The color-mixed portion is irradiated with a laser beam in a wavelength region of greater than or equal to 400 nm and less than or equal to 535 nm, so that the color filter material to transmit red light is selectively removed.

The color filter of the present invention has the light-transmitting substrate, at least a first colored layer where the first color filter material is dropped, and a second colored layer where the second color filter material is dropped over the substrate. The second color filter material which is dropped over the first colored layer is selectively removed by irradiation with a laser beam.

An electronic appliance according to the present invention includes the color filter manufactured by any of the above manufacturing methods.

According to the present invention, the defect resulting from the color mixing of the color filter materials in the adjacent pixel regions can be corrected easily, and a yield of the color filter is improved.

Further, in the method for manufacturing the color filter of the present invention, all the color filter materials in the color-mixed pixel are not removed unlike a conventional method, and the color filter material which is unnecessary can be selectively removed; therefore, a step of filling again the color filter material to the portion in which all of the color filter materials are removed by laser irradiation, which is required in the conventional method, can be omitted.

BRIEF DESCRIPTION OF THE DRAWINGS

In the accompanying drawings:

FIG. 3 is a cross sectional view of an active matrix liquid crystal display device;

FIGS. 7A to 7C are optical photomicrographs of the regions irradiated with the laser beam;

DETAILED DESCRIPTION OF THE INVENTION

Figure 1A:
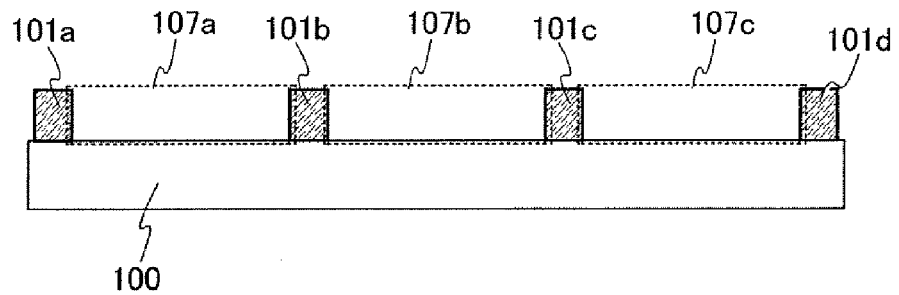
FIGS. 1A to 1E show a step of manufacturing a color filter to which a method for correcting the color filter of the present invention is applied.

Hereinafter, embodiment modes and an embodiment of the present invention will be described with reference to the accompanying drawings. However, the present invention can be implemented in various modes. As can be easily understood by a person skilled in the art, the modes and details of the present invention can be changed in various ways without departing from the spirit and scope of the present invention. Thus, the present invention should not be interpreted as being limited to the following description of the embodiment modes and an embodiment.

Embodiment Mode 1

This embodiment mode will describe a color filter which is manufactured using a manufacturing method of the present invention.

First, a structure of the color filter in accordance with this embodiment mode is described. The color filter in this embodiment mode includes partition walls (black matrixes) 101a to 101d which are formed over a light-transmitting substrate 100, a colored layer (R) 102, a colored layer (G) 103, a colored layer (B) 104 as shown in FIG. 1E. Further, the color filter also includes a resin layer 106 which is formed over the partition walls 101a to 101d, the colored layer (R) 102, the colored layer (G) 103 and the colored layer (B) 104.

Hereinafter, a method for manufacturing the color filter in accordance with this embodiment mode is described with reference to FIGS. 1A to 1E. First, the partition walls 101a to 101d are formed over the light-transmitting substrate 100 (see FIG. 1A), so that depressed portions to which color filter materials are dropped are formed. In this embodiment mode, a depressed portion 107a is formed by using the substrate 100 and the partition walls 101a and 101b. A depressed portion 107b is formed by using the substrate 100 and the partition walls 101b and 101c, and a depression portion 107c is formed by using the substrate 100 and the partition walls 101c and 101d. A color filter material of a desired color is dropped into each of the depressed portions 107a to 107c, so that the colored layers are formed. Note that the partition walls 101a to 101d are provided to prevent color mixing of the color filter material having the predetermined color and a color filter material which is dropped into the adjacent colored layers.

The partition walls 101a to 101d are formed of a light-shielding material (a photosensitive or non-photosensitive organic material (e.g., polymers or resins based on polyimide, acrylic polymer, polyamide, polyimideamide, or polymers having benzocyclobutene moiety) in which black pigment or carbon black is dispersed, or an SOG film (e.g., a silicon oxide film containing an alkyl group)).

Figure 1B:
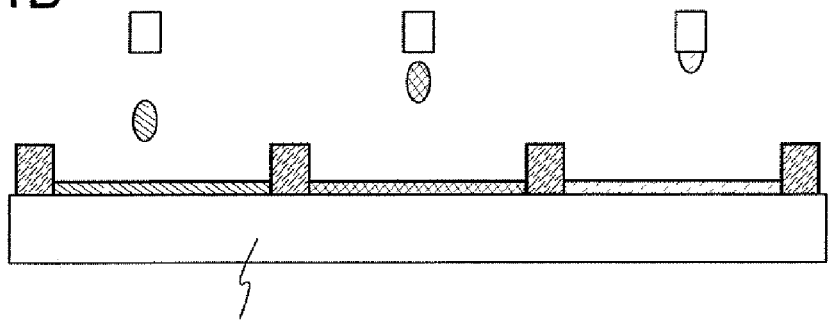

Next, the color filter materials are dropped by a droplet discharging method (e.g., an ink-jet method) to form the desired colored layers (R, G and B) in the depressed portions between the partition walls (see FIG. 1B). In FIG. 1B, a red color filter material corresponding to the colored layer (R) 102 is dropped into the depressed portion 107a. Further, a green color filter material corresponding to the colored layer (G) 103 and a blue color filter material corresponding to the colored layer (B) are dropped into the depressed portion 107b and the depressed portion 107c, respectively. Note that, in this specification, the colored layer (R) indicates a colored layer which transmits red light (light having a peak wavelength in the vicinity of 690 nm), the colored layer (G) indicates a colored layer which transmits green light (light having a peak wavelength in the vicinity of 550 nm), and the colored layer (B) indicates a colored layer which transmits blue light (light having a peak wavelength in the vicinity of 450 nm).

Figure 6:
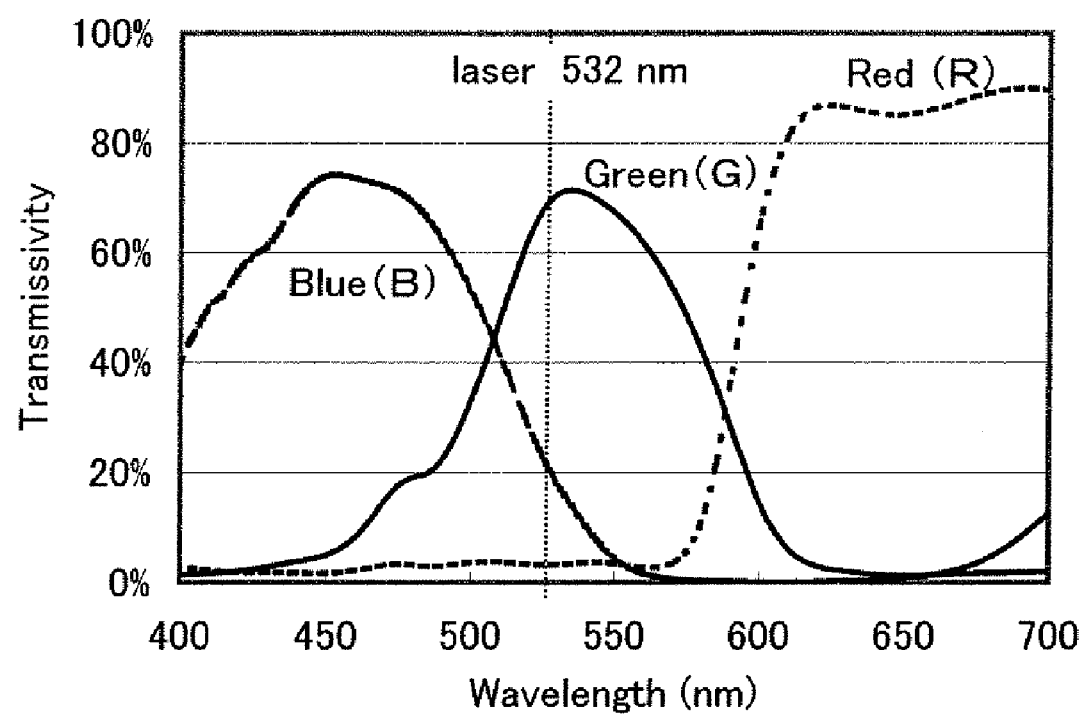
FIG. 6 shows transmissivity of light in the wavelength from 400 to 700 nm to each color filter material.

FIG. 6 shows transmissivity of light in a wavelength region of 400 to 700 nm to the red, green, and blue color filter materials (hereinafter, also referred to as Red (R), Green (G) and Blue (B), respectively). In FIG. 6, the horizontal axis indicates a wavelength (nm), and the vertical axis indicates transmissivity (%). Red (R) selectively transmits light with a wavelength of greater than or equal to 600 nm and selectively absorbs light with a wavelength of less than or equal to 560 nm, so that transmitted light exhibits red color strongly. Green (G) selectively transmits light with a wavelength in a vicinity of 550 nm and selectively absorbs light with a wavelength of less than or equal to 470 nm and greater than or equal to 600 nm, so that transmitted light exhibits green color strongly. Blue (B) selectively transmits light with a wavelength in a vicinity of 450 nm and selectively absorbs light with a wavelength of greater than or equal to 530 nm, so that transmitted light exhibits blue color strongly.

A curable ink can be used as the color filter materials, for example. Curable ink is cured by light irradiation, heating, or both of them, and both liquid ink and solid ink can be used. Further, both pigment and dye can be used as the color filter materials. The curable ink includes a resin component which is cured by light irradiation, heating, or both of them, a color material, an organic solvent, and water. An acrylic-based resin, an epoxy-based resin, a melamine-based resin, or the like is preferably used as a curing component.

Figure 1C:
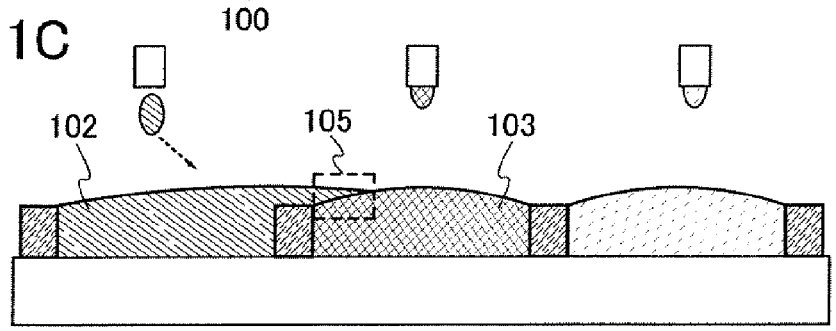

In this embodiment mode, the partition walls 101a to 101d are provided to prevent color mixing of the color filter materials which are dropped into the adjacent colored layers and are different in color from each other. However, when a certain amount or more of the color filter materials are applied in a short time or when the landing accuracy of the color filter materials is deteriorated, color mixing readily occurs. For example, a color-mixed portion 105 where both Green (G) forming the colored layer (G) 103 and Red (R) forming the colored layer (R) 102 are dropped, is formed as shown in FIG. 1C. Note that, in this specification, the color-mixed portion indicates a region where plural color filter materials with different colors are dropped and overlapped in one colored layer.

Figure 1D:
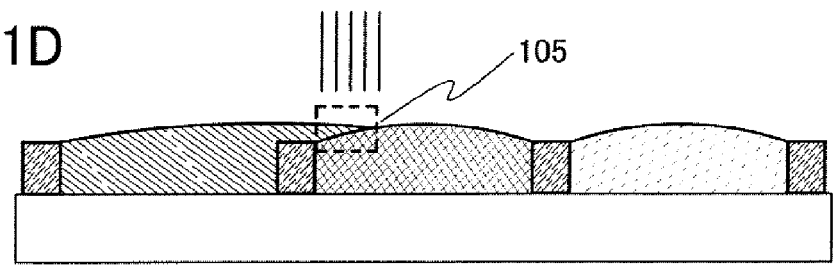
Figure 1E:
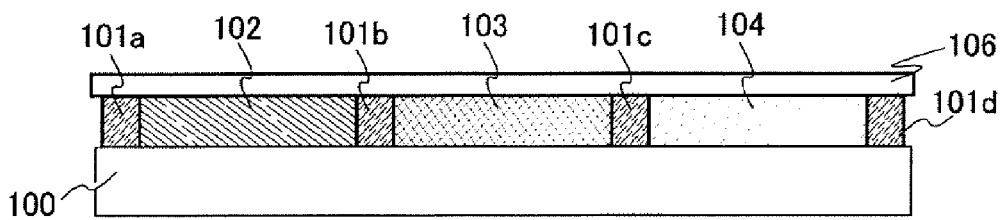

When the color-mixed portion 105 is formed over the colored layer, the color-mixed portion 105 is irradiated with a laser beam to correct the color-mixed portion 105 as shown in FIG. 1D. In this embodiment mode, the color-mixed portion 105 is irradiated with a laser beam of which transmissivity to Green (G) is higher than that to Red (R) by preferably greater than or equal to 10%, more preferably greater than or equal to 15%, so that energy of the laser beam can be more efficiently absorbed by Red (R) with transmissivity lower than that of Green (G). As a result, Red (R) can be selectively removed without removal of Green (G). Table 1 shows the relation between the wavelength and the transmissivity in a wavelength region where a difference between transmissivities of the laser beam to Green (G) and Red (R) is greater than or equal to 10% to 15% among the measurement results shown in FIG. 6, in order to obtain more specific numeric values.

TABLE 1

Relationship between the wavelength and the transmissivity

| Wavelength [nm] | Transmissivity [%] | | (G − R) [%][a] |
|---|---|---|---|
| | Green (G) | Red (R) | |
| 465 | 11 | 3 | 8 |
| 470 | 15 | 3 | 12 |
| 475 | 18 | 3 | 15 |
| 480 | 19 | 3 | 16 |
| 485 | 20 | 3 | 17 |
| 490 | 22 | 3 | 19 |
| 495 | 27 | 3 | 24 |
| 500 | 33 | 4 | 29 |
| 505 | 40 | 4 | 36 |
| 510 | 48 | 4 | 44 |
| 515 | 56 | 4 | 52 |
| 520 | 63 | 3 | 60 |
| 525 | 68 | 3 | 65 |
| 530 | 71 | 3 | 68 |
| 535 | 71 | 4 | 67 |
| 540 | 71 | 4 | 67 |
| 545 | 69 | 4 | 65 |
| 550 | 67 | 3 | 64 |
| 555 | 65 | 3 | 62 |
| 560 | 61 | 3 | 58 |
| 565 | 58 | 3 | 55 |
| 570 | 53 | 4 | 49 |
| 575 | 48 | 6 | 42 |
| 580 | 42 | 11 | 31 |
| 585 | 35 | 21 | 14 |
| 590 | 28 | 36 | −8 |

[a]Difference in light transmissivity between (G) and (R).

It is found from Table 1 and FIG. 6 that a wavelength region in which light transmissivity to Green (G) is higher than that to Red (R) by greater than or equal to 10% is greater than or equal to 470 nm and less than or equal to 585 nm. Accordingly, it is preferable that the color-mixed portion be irradiated with the laser beam with the wavelength greater than or equal to 470 nm and less than or equal to 585 nm (more preferably, greater than or equal to 480 nm and less than or equal to 580 nm) in order to remove Red (R) selectively.

Next, the resin layer 106, which is formed of an acrylic resin, an epoxy resin, an polyimide resin, or the like is formed over the partition walls 101a to 101d, the colored layer (R) 102, the colored layer (G) 103, and the colored layer (B) 104, as shown in FIG. 1E. It is preferable to form the resin layer with a thickness of greater than or equal to 1 μm and less than or equal to 3 μm (a thickness which can planarize a step generated by the colored layers).

The color filter according to the present invention is manufactured through the above-described steps. Note that the substrate 100, the partition walls 101a to 101d, the colored layer (R) 102, the colored layer (G) 103, the colored layer (B) 104, and the resin layer 106 are collectively referred to as the color filter in FIG. 1E.

Note that the present invention is not limited to the color mixing of Red (R) and Green (G) as described above, and can be used for correcting color mixing of Red (R) and Blue (B) or color mixing of Green (G) and Blue (B). At this time, a laser beam with a wavelength of which transmissivity to the color filter material that is to be left is higher than that to the color filter material that is to be removed by preferably greater than or equal to 10%, more preferably, greater than or equal to 15%, is used. That is, when the second color filter material is selectively removed from a color-mixed portion where a second color filter material is dropped over a first color filter material, the second color filter material may be irradiated with a laser beam of which transmissivity to the first color filter material is higher than that to the second color filter material by greater than or equal to 10% (preferably, greater than or equal to 15%).

By irradiation of the color-mixed portion with a laser beam which is different in transmissivity to each color filter material, higher energy of the laser beam is focused on a color filter material with lower transmissivity, so that the color filter material can be selectively removed. Similarly to Table 1, Tables 2 to 6 each show the relation between the wavelength and the transmissivity in a wavelength region where a difference in light transmissivity between two color filter materials having a different color is greater than or equal to 10%, preferably greater than or equal to 15%.

For example, when Blue (B) overlaps Green (G) in the colored layer (G), it is found from Table 2 that the color-mixed portion is preferably irradiated with a laser beam with a wavelength of greater than or equal to 515 nm and less than or equal to 600 nm preferably, greater than or equal to 515 nm and less than or equal to 595 nm).

TABLE 2

Relationship between the wavelength and the transmissivity

| Wavelength [nm] | Transmissivity [%] | | |
|---|---|---|---|
| | Green (G) | Blue (B) | (G − B) [%][a] |
| 510 | 48 | 41 | 7 |
| 515 | 56 | 35 | 21 |
| 520 | 63 | 29 | 34 |
| 525 | 68 | 23 | 45 |
| 530 | 71 | 18 | 53 |
| 535 | 71 | 14 | 57 |
| 540 | 71 | 10 | 61 |
| 545 | 69 | 7 | 62 |
| 550 | 67 | 5 | 62 |
| 555 | 65 | 3 | 62 |
| 560 | 61 | 2 | 59 |
| 565 | 58 | 1 | 57 |
| 570 | 53 | 1 | 52 |
| 575 | 48 | 1 | 47 |
| 580 | 42 | 0 | 42 |
| 585 | 35 | 0 | 35 |
| 590 | 28 | 0 | 28 |
| 595 | 21 | 0 | 21 |
| 600 | 14 | 0 | 14 |
| 605 | 9 | 0 | 9 |

[a]Difference in light transmissivity between (G) and (B)

When Green (G) overlaps Red (R) in the colored layer (R), it is found from Table 3 that the color mixed portion is preferably irradiated with a laser beam with a wavelength of greater than or equal to 595 nm and less than or equal to 700 nm.

TABLE 3

Relationship between the wavelength and the transmissivity

| Wavelength [nm] | Transmissivity [%] | | |
|---|---|---|---|
| | Red (R) | Green (G) | (R − G) [%][a] |
| 590 | 36 | 28 | 8 |
| 595 | 52 | 21 | 31 |
| 600 | 66 | 14 | 52 |
| 605 | 75 | 9 | 66 |
| 610 | 81 | 6 | 75 |
| 615 | 85 | 4 | 81 |
| 620 | 87 | 3 | 84 |
| 625 | 87 | 2 | 85 |
| 630 | 87 | 2 | 85 |
| 635 | 86 | 2 | 84 |
| 640 | 86 | 2 | 84 |
| 645 | 85 | 1 | 84 |
| 650 | 85 | 1 | 84 |
| 655 | 86 | 1 | 85 |
| 660 | 86 | 2 | 84 |
| 665 | 87 | 2 | 85 |
| 670 | 88 | 3 | 85 |
| 675 | 89 | 4 | 85 |
| 680 | 89 | 5 | 84 |
| 685 | 90 | 6 | 84 |
| 690 | 90 | 8 | 82 |
| 695 | 90 | 10 | 80 |
| 700 | 90 | 12 | 78 |

[a]Difference in light transmissivity between (R) and (G)

When Blue (B) overlaps Red (R) in the colored layer (R), it is found from Table 4 that the color mixed portion is preferably irradiated with a laser beam with a wavelength of greater than or equal to 580 nm and less than or equal to 700 nm (preferably greater than or equal to 585 nm and less than or equal to 700 nm).

TABLE 4

Relationship between the wavelength and the transmissivity

| Wavelength [nm] | Transmissivity [%] | | |
|---|---|---|---|
| | Red (R) | Blue (B) | (R − B) [%][a] |
| 575 | 6 | 1 | 5 |
| 580 | 11 | 0 | 11 |
| 585 | 21 | 0 | 21 |
| 590 | 36 | 0 | 36 |
| 595 | 52 | 0 | 52 |
| 600 | 66 | 0 | 66 |
| 605 | 75 | 0 | 75 |
| 610 | 81 | 0 | 81 |
| 615 | 85 | 0 | 85 |
| 620 | 87 | 0 | 87 |
| 625 | 87 | 0 | 87 |
| 630 | 87 | 0 | 87 |
| 635 | 86 | 0 | 86 |
| 640 | 86 | 1 | 85 |
| 645 | 85 | 1 | 84 |
| 650 | 85 | 1 | 84 |
| 655 | 86 | 1 | 85 |
| 660 | 86 | 1 | 85 |
| 665 | 87 | 2 | 85 |
| 670 | 88 | 2 | 86 |
| 675 | 89 | 2 | 87 |
| 680 | 89 | 2 | 87 |
| 685 | 90 | 2 | 88 |
| 690 | 90 | 2 | 88 |
| 695 | 90 | 2 | 88 |
| 700 | 90 | 2 | 88 |

[a]Difference in light transmissivity between (R) and (B)

When Green (G) overlaps Blue (B) in the colored layer (B), it is found from Table 5 that the color mixed portion is preferably irradiated with a laser be and less than or equal to 500 nm.

TABLE 5

Relationship between the wavelength and the transmissivity

| Wavelength [nm] | Transmissivity [%] | | |
| --- | --- | --- | --- |
| | Blue (B) | Green (G) | (B − G) [%][a] |
| 400 | 40 | 1 | 39 |
| 405 | 46 | 2 | 44 |
| 410 | 50 | 2 | 48 |
| 415 | 53 | 2 | 51 |
| 420 | 57 | 2 | 55 |
| 425 | 59 | 2 | 57 |
| 430 | 61 | 3 | 58 |
| 435 | 65 | 3 | 62 |
| 440 | 70 | 4 | 66 |
| 445 | 73 | 4 | 69 |
| 450 | 74 | 5 | 69 |
| 455 | 74 | 6 | 68 |
| 460 | 74 | 8 | 66 |
| 465 | 73 | 11 | 62 |
| 470 | 72 | 15 | 57 |
| 475 | 71 | 18 | 53 |
| 480 | 69 | 19 | 50 |
| 485 | 66 | 20 | 46 |
| 490 | 62 | 22 | 40 |
| 495 | 58 | 27 | 31 |
| 500 | 53 | 33 | 20 |
| 505 | 47 | 40 | 7 |

[a]Difference in light transmissivity between (B) and (G)

When Red (R) overlaps Blue (B) in the colored layer (B), it is found from Table 6 that the color mixed portion is preferably irradiated with a laser beam with a wavelength of greater than or equal to 400 nm and less than or equal to 535 nm (preferably greater than or equal to 400 nm and less than or equal to 530 nm).

TABLE 6

Relationship between the wavelength and the transmissivity

| Wavelength [nm] | Transmissivity [%] | | |
| --- | --- | --- | --- |
| | Blue (B) | Red (R) | (B − R) [%][a] |
| 400 | 40 | 3 | 37 |
| 405 | 46 | 3 | 43 |
| 410 | 50 | 2 | 48 |
| 415 | 53 | 2 | 51 |
| 420 | 57 | 2 | 55 |
| 425 | 59 | 2 | 57 |
| 430 | 61 | 2 | 59 |
| 435 | 65 | 2 | 63 |
| 440 | 70 | 2 | 68 |
| 445 | 73 | 2 | 71 |
| 450 | 74 | 2 | 72 |
| 455 | 74 | 2 | 72 |
| 460 | 74 | 2 | 72 |
| 465 | 73 | 3 | 70 |
| 470 | 72 | 3 | 69 |
| 475 | 71 | 3 | 68 |
| 480 | 69 | 3 | 66 |
| 485 | 66 | 3 | 63 |
| 490 | 62 | 3 | 59 |
| 495 | 58 | 3 | 55 |
| 500 | 53 | 4 | 49 |
| 505 | 47 | 4 | 43 |
| 510 | 41 | 4 | 37 |
| 515 | 35 | 4 | 31 |
| 520 | 29 | 3 | 26 |
| 525 | 23 | 3 | 20 |
| 530 | 18 | 3 | 15 |
| 535 | 14 | 4 | 10 |
| 540 | 10 | 4 | 6 |

[a]Difference in light transmissivity between (B) and (R)

Further, a method for correcting the color filter of the present invention can be used not only for color mixing of two color filter materials each having a different color hut also for color mixing of three color filter materials each having a different color.

Note that, in this embodiment mode, an example is shown in which the color-mixed portion is irradiated with a laser beam from a front surface side of the substrate (a side of a surface over which the colored layers are formed); however, the embodiment mode of the present invention is not limited thereto. The color-mixed portion may be irradiated with a laser beam from a rear surface side of the substrate (a side of a surface opposed to the colored layers).

Further, an anti-reflection film may be provided on a surface opposite to the surface over which the colored layers are formed. The anti-reflection film is a single layer film or a stacked layer film with which reflected light is hardly generated by adjustment of a refractive index and a film thickness, and a known anti-reflection film may be used. Further, a circularly polarizing plate (including a circularly polarizing film) may be provided instead of the anti-reflection film.

In this embodiment mode, an example is shown in which the partition walls 101a to 101d are formed directly over the substrate 100; however, the embodiment mode of the present invention is not limited thereto. For example, a TFT is formed over the substrate and the color filter may be formed over the TFT. Note that surface treatment is preferably performed to a surface over which the color filter is formed in order to improve diffusivity of the color filter material in any of the cases.

In the present invention, the color-mixed portion where color-mixing takes place by overlapping of plural color filter materials with a different color is irradiated with a laser beam of which transmissivity to each color filter material is different, so that only the color filter material to which transmissivity of the laser beam is lower can be selectively removed. Therefore, unlike the conventional method, it is not necessary to fill the color filter material again to the portion in which the color filter materials are completely removed by the laser irradiation, which allows suppression of the yield reduction in a step of manufacturing the color filter.

Embodiment Mode 2

This embodiment mode shows a manufacturing example of an active matrix liquid crystal display device using a color filter (see FIG. 3).

First, a pixel portion 300 is formed by forming a semiconductor layer and a TFT 301 having the semiconductor layer as its active layer, and the like over a substrate 200. A procedure for manufacturing a TFT is hereinafter described simply with reference to FIGS. 2A to 2E.

Figure 2A:
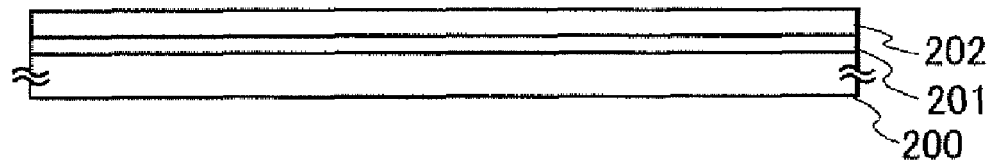
FIGS. 2A to 2E are cross sectional views of a step of manufacturing a TFT.

In FIG. 2A, a reference numeral 200 denotes a substrate having an insulating surface; 201, an base insulating film as a blocking layer; and 202, a semiconductor film having a crystalline structure.

In FIG. 2A, the substrate 200 may be a glass substrate, a quartz substrate, a ceramic substrate, or the like. Further, a silicon substrate, a metal substrate, or a stainless steel substrate having an insulating film formed over its surface may be used. Furthermore, a plastic substrate having heat resistance which can withstand process temperature in this step may also be used.

First, as shown in FIG. 2A, a base insulating film 201 formed using an insulating film such as a silicon oxide film, a silicon nitride film, or a silicon oxynitride film ($SiO_xN_y$: x>y>0) is formed over the substrate 200. For example, the base insulating film 201 has a two-layer structure in which a silicon nitride oxide film with a thickness of 50 to 100 nm formed by using $SiH_4$, $NH_3$, and $N_2O$ as reactive gas and a silicon oxynitride film with a thickness of 100 to 150 nm formed by using $SiH_4$ and $N_2O$ as reactive gas, are stacked. It is preferable to use a silicon nitride film or a silicon nitride oxide film ($SiN_xO_y$: x>y>0) with a thickness of less than or equal to 10 nm as a layer of the base insulating film 201. Moreover, a three-layer structure may also be used in which a silicon nitride oxide film, a silicon oxynitride film, and a silicon nitride film are sequentially stacked. Note that the base insulating film is not necessarily formed.

Next, a semiconductor film having an amorphous structure is formed over the base insulating film. The semiconductor film is formed of a semiconductor material containing silicon as its main component. For example, an amorphous silicon film or an amorphous silicon germanium film is formed by a sputtering method, an LPCVD method, a plasma CVD method, or the like at a thickness of 25 to 80 nm (preferably 30 to 60 nm). In this embodiment mode, an amorphous silicon film with a thickness of 55 nm is formed by a plasma CVD method. Next, crystallization treatment is performed to a semiconductor film having an amorphous structure by laser irradiation, so that a semiconductor film 202 having a crystalline structure is obtained. Note that crystallization treatment is not limited to a laser crystallization method. RTA, a thermal crystallization method using an anneal furnace or the like, or a thermal crystallization method using a catalyst such as nickel can be used for crystallization treatment.

As a laser oscillator used for the laser irradiation, a laser oscillator capable of emitting ultraviolet light, visible light, or infrared light can be used. As the laser oscillator, an excimer laser oscillator using KrF, ArF, XeCl, Xe, or the like; a gas laser oscillator using He, He—Cd, Ar, He—Ne, HF, or the like; a solid-state laser oscillator in which a crystal of YAG, $GdVO_4$, $YVO_4$, YLF, $YAlO_3$, or the like is doped with Cr, Nd, Er, Ho, Ce, Co, Ti, or Tm; or a semiconductor laser oscillator using GaN, GaAs, GaAlAs, InGaAsP, or the like can be used. As for the solid-state laser oscillator, it is preferable to use first to fifth harmonics of a fundamental wave.

For example, an excimer laser beam with a wavelength of less than or equal to 400 nm, or a second or third harmonic of a YAG laser is used as a laser beam. Further, for example, a pulsed laser beam having a repetition rate of approximately 10 Hz to 100 MHz is used.

Figure 2B:
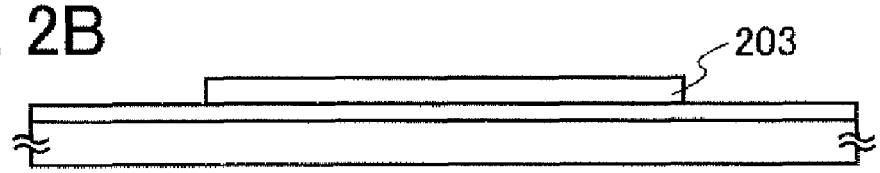

Next, etching is selectively performed by using a photolithography technique to obtain a semiconductor layer 203 (see FIG. 2B). Before formation of a resist mask used in the etching, ozone is generated with the use of an ozone-containing aqueous solution or UV irradiation in an oxygen atmosphere, so that an oxide film is formed in order to protect the semiconductor layer. Here, the oxide film also has an advantageous effect to improve the wettability of the resist.

If necessary, a small amount of impurity elements (boron or phosphorus) is added through the oxide film in order to control a threshold value of a TFT before performing etching selectively. When the impurity elements are added through the oxide film, the oxide film is removed and another oxide film is formed again using an ozone-containing water solution.

Figure 2C:
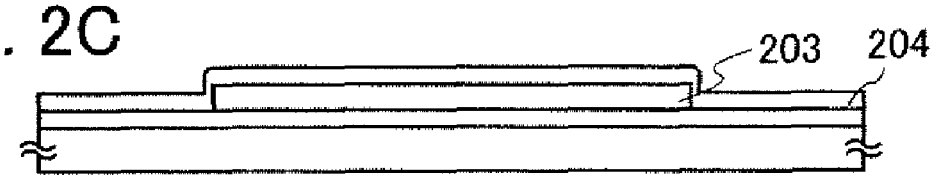

Next, an insulating film containing silicon as its main component is formed as a gate insulating film 204 so as to cover the surface of the semiconductor layer 203 (see FIG. 2C). Here, for reduction of the number of steps, the gate insulating film 204 is formed without removing the oxide film formed over the surface of the semiconductor layer 203. The oxide film may be removed with etchant containing hydrofluoric acid before formation of the gate insulating film 204. The oxide film over the semiconductor layer 203 is not necessarily removed completely, and the oxide film may be remained thinly. If etching is performed excessively to expose the semiconductor layer 203, the surface of the semiconductor layer 203 may be contaminated with an impurity.

Figure 2D:
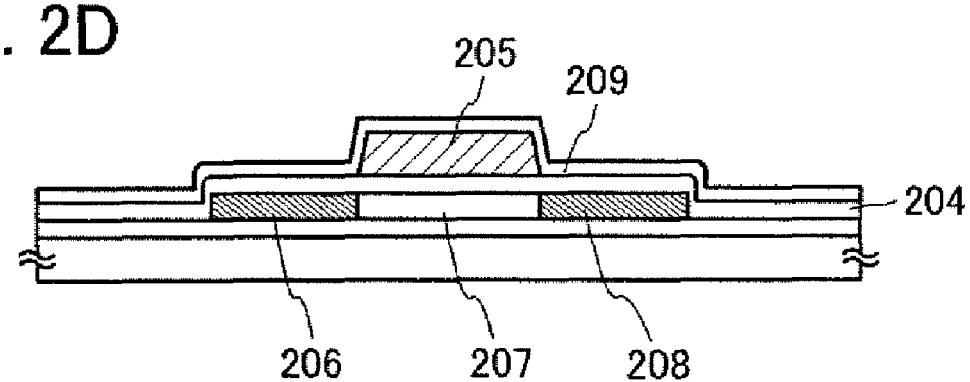

Next, after washing the surface of the gate insulating film 204, a gate electrode 205 is formed (FIG. 2D). Then, an impurity element imparting n-type conductivity to a semiconductor (such as P or As), here phosphorus, is added appropriately to form a source region 206 and a drain region 208 and define a channel formation region 207. Subsequently, an interlayer insulating film 209 is formed. As the interlayer insulating film 209, an insulating film containing silicon is formed at a thickness of 100 to 200 nm by a plasma CVD method or a sputtering method. In this embodiment mode, a silicon oxynitride film with a thickness of 150 nm is formed by a plasma CVD method. The interlayer insulating film 209 is not limited to the silicon oxynitride film and may have a single-layer structure or stacked-layer structure including another insulating film containing silicon. After that, heat treatment, intense light irradiation, or irradiation with a laser beam is performed in order to activate the impurity element. At the same time as the activation, it is possible to recover plasma damage of the gate insulating film or plasma damage of an interface between the gate insulating film and the semiconductor layer. In particular, it is very effective to activate the impurity element by irradiating with the second harmonic of a YAG laser from a front surface side or a rear surface side of the substrate in an atmosphere at a room temperature to 300° C. A YAG laser is a preferable activation means because the frequent maintenance is not necessary.

As the subsequent steps, an interlayer insulating film 210 is formed; hydrogenation is performed; contact holes reaching the source region 206 and the drain region 208 are formed; a conductive film is formed; and etching is selectively performed to form a source electrode 211 and a drain electrode 212. Thus, the fabrication of a TFT (n-channel TFT) is completed (see FIG. 2E). The source electrode 211 and the drain electrode 212 are formed of a single layer or a stacked layer including an element selected from Mo, Ta, W, Ti, Al, or Cu, or an alloy material or compound containing the above element as its main component. For example, a three-layer structure including a Ti film, a pure-Al film, and another Ti film, or a three-layer structure including a Ti film, an Al alloy film containing Ni and C, and another Ti film is used. Moreover, in consideration of forming an interlayer insulating film and the like in a later step, the cross-sectional shape of the electrode is preferably tapered.

Figure 2E:
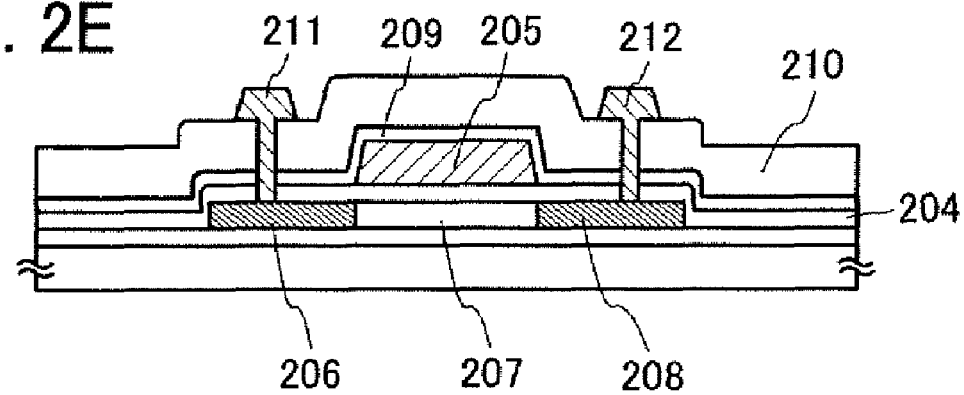

The present invention is not limited to the TFT structure shown in FIG. 2E. The TFT may also have a structure in which an LDD (Lightly Doped Drain) region is provided between the channel formation region and the drain region (or the source region) if necessary. In this structure, a region in which an impurity element is added at low concentration is provided between the channel formation region and a source region or a drain region which is formed by adding the impurity element at high concentration, and this region is referred to as the LDD region. Moreover, a structure can also be employed in which the LDD region is arranged to overlap the gate electrode through the gate insulating film.

Although the manufacturing example of an n-channel TFT is described here, a p-channel TFT can also be formed by using a p-type impurity element instead of the n-type impurity element.

Here, although the top-gate TFT is described as an example, the present invention can be applied regardless of the TFT structure. For example, the present invention can be applied to a bottom-gate (inverted staggered) TFT or a staggered TFT.

The pixel portion 300 of the liquid crystal display device in this embodiment mode is formed using the TFT formed through the above-described steps (see FIG. 3). The pixel portion includes pixel electrodes 302 which are arranged in matrix, a switching element which is connected to the pixel electrodes 302 (here, a top-gate TFT 301), and a storage capacitor. The storage capacitor has an insulating film sandwiched between an electrode connected to the pixel electrode 302 and the semiconductor layer, as a dielectric.

Note that this embodiment mode shows an example of a double gate TFT having a plurality of channel formation regions in order to decrease an off-current. However, a structure of a TFT which forms the liquid crystal display device according to the present invention is not limited thereto. For example, a single gate TFT may also be used.

After formation of the pixel portion 300, an alignment film 305 is formed so as to cover the pixel electrodes 302. The alignment film 305 is subjected to rubbing treatment. The rubbing treatment is not performed in some cases in a specific mode of a liquid crystal (e.g. a VA mode).

Next, a counter substrate 315 is prepared. In this embodiment mode, the color filter manufactured in Embodiment Mode 1 is used as the counter substrate 315. A colored layer 310 manufactured by the correcting method shown in Embodiment Mode 1, a planarizing film 309, a counter electrode 308 and an alignment film 307 are provided on an inner side of the counter substrate (on the side which is in contact with a liquid crystal). Note that the rubbing treatment is performed to the alignment film 307; however, similarly to the alignment film 305, the rubbing treatment is not performed in some cases in a specific mode of a liquid crystal (e.g. a VA mode).

Next, a sealant 311 is patterned on the counter substrate 315 by a droplet discharge method. Here, the sealant 311 is formed at a predetermined position (a closed pattern surrounding the pixel portion) with a dispenser apparatus or an ink-jet apparatus under an inert gas atmosphere or low pressure. As a semi-transparent sealant 311, a material containing a filler (diameter of 6 to 24 µm) and having a viscosity of 40 to 400 Pa·s is used. Note that the sealant which does not dissolve in a liquid crystal to be in contact later is preferably selected. As the sealant, an acrylic photocurable resin or an acrylic thermosetting resin may be used. Since the sealant 311 has a simple seal pattern, the sealant 311 can also be formed by a printing method. Then, the sealant 311 is temporally cured.

Next, the substrate 200 and the counter substrate 315 are attached to each other, and at the same time, ultraviolet light irradiation or heat treatment is performed to cure the sealant 311 under low pressure. Note that heat treatment may be performed in addition to ultraviolet light irradiation. Further, a spacer 303 is provided in a part of the pixel portion 300 in order to keep a space between the substrate 200 and the counter substrate 315. The spacer 303 has a columnar shape, a spherical shape, or the like. This embodiment mode shows an example in which a spacer having a columnar shape is provided.

Next, the substrate is divided into a panel size appropriately, and then a liquid crystal is injected between the substrate 200 and the counter substrate 315 to form a liquid crystal layer 306. It is preferable to inject the liquid crystal in vacuum. The liquid crystal layer 306 can also be formed by a method other than an injecting method. For example, a liquid crystal is dropped over the substrate, and then the counter substrate 315 may be attached to the substrate 200. A dripping method may be employed when a large substrate to which an injection method is difficult to be applied is used.

Then, an FPC, an IC, an optical film, or the like is attached appropriately, whereby a liquid crystal module is manufactured.

Next, a backlight bulb 314 and a mirror are provided to the obtained liquid crystal module, and the module is covered with a cover 313. Thus, an active matrix liquid crystal display device (transmissive type) whose cross sectional view is partially shown in FIG. 3 is completed. Alternatively, the backlight may be disposed outside the display region and a light guide plate may be used. The cover and the liquid crystal module are fixed by using an adhesive or an organic resin. Since the device is a transmissive type, polarizing plates 312 are attached to both of the substrate 200 and the counter substrate 315. Further, another optical film (such as an anti-reflection film or a polarizing film) or a protective film (not shown) may be provided.

The liquid crystal display device according to the present invention may include an n-channel TFT and a p-channel TFT over the same substrate. The pixel portion and a driver circuit may be formed with only an n-channel TFT or only a p-channel TFT to reduce the number of steps.

The color filter without color mixing can be manufactured efficiently and easily by the method for manufacturing the color filter according to the present invention. Further, only the color filter material which is unnecessary in the color-mixed portion can be selectively removed; therefore, the waste of the color filter material can be eliminated. Accordingly, by adopting the color filter of the present invention, the liquid crystal display device without display unevenness can be provided at low costs.

Embodiment Mode 3

Figure 4A:
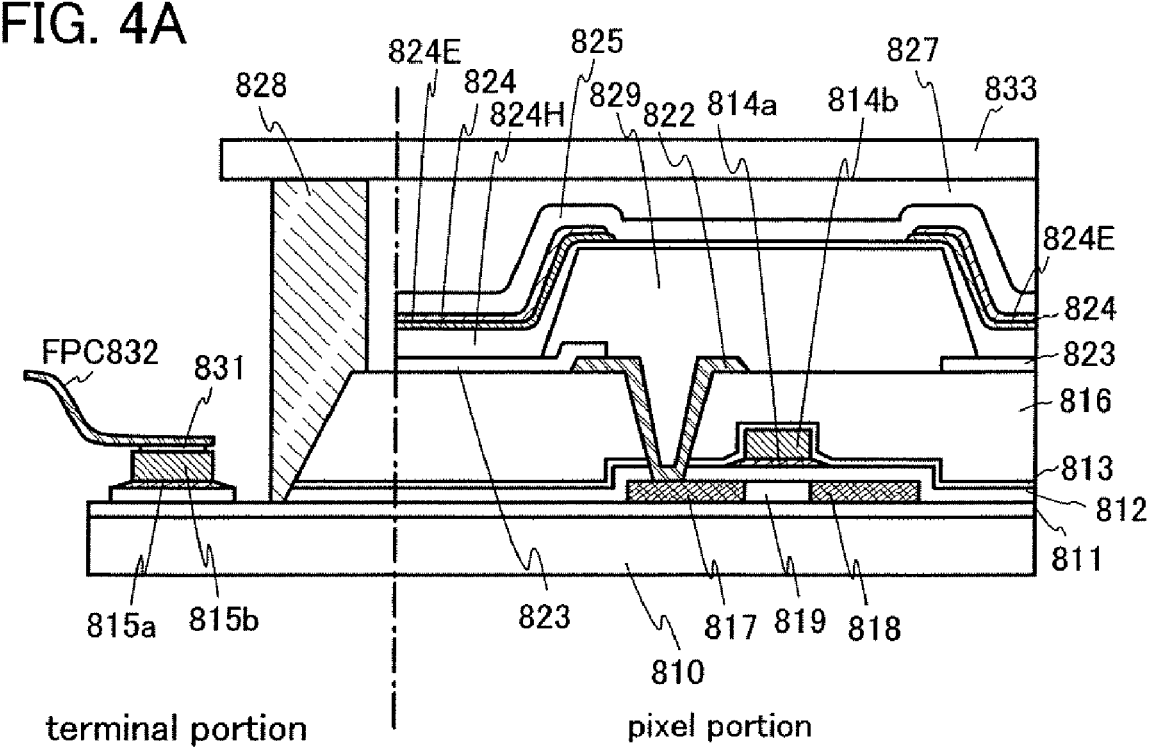
FIGS. 4A and 4B are views showing a structure of an active matrix EL display device.
Figure 4B:
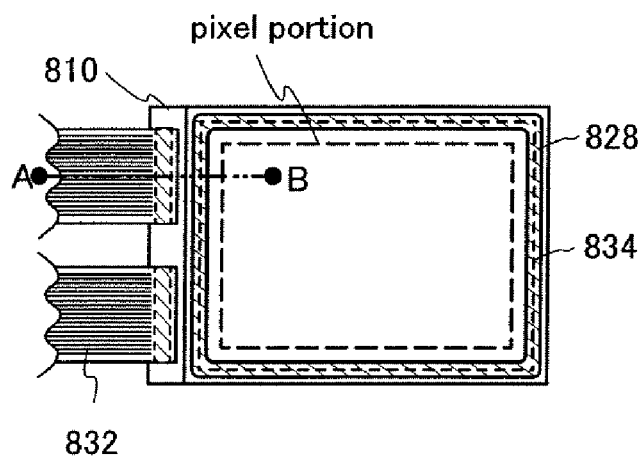

This embodiment mode will describe a method for manufacturing a light-emitting device having an EL element (FIGS. 4A and 4B), which is also referred to as an organic EL display or an organic light-emitting diode, with the use of the color filter of the present invention. Note that FIG. 4B is a top view of the light-emitting device in this embodiment mode. FIG. 4A is a cross sectional view taken along a dashed line A-B of FIG. 4B.

An EL element having a layer including an organic compound as a light-emitting layer has a structure in which the layer including an organic compound (hereinafter referred to as an EL layer) is interposed between an anode and a cathode. By application of an electric field to the anode and the cathode, luminescence (electro luminescence) is generated from the EL layer Light emitted from the EL element includes light generated when a singlet-excited molecules relaxes to a ground state (fluorescence) and light generated when a molecules in the triplet-excited state relaxes to the ground state phosphorescence).

First, a base insulating film 811 is formed over a substrate 810. When light is extracted by setting the substrate 810 side as a display surface, a glass substrate or quartz substrate having a light-transmitting property may be used as the substrate 810. Moreover, a light-transmitting plastic substrate which can withstand process temperature may also be used. On the other hand, when light is extracted by setting a side opposite to the substrate 810 side as the display surface, a silicon substrate, a metal substrate, or a stainless steel substrate with an insulating film formed on its surface may also be used in addition to the above-described substrate. Here, a glass substrate is used as the substrate 810. The refractive index of the glass substrate is approximately 1.55.

A base film including an insulating film such as a silicon oxide film, a silicon nitride film, or a silicon oxynitride film is formed as the base insulating film 811. Here, an example of forming the base film having a two-layer structure is shown; however, a single layer structure or stacked layer structure having two layers or more including the insulating film may also be employed. Note that the base insulating film is not necessarily formed.

Next, a semiconductor layer is formed over the base insulating film. The semiconductor layer is formed with a semiconductor film having an amorphous structure by a sputtering method, an LPCVD method, a plasma CVD method, or the like. Subsequently, crystallization treatment is performed to obtain a crystalline semiconductor film. As crystallization treatment, a method such as a laser crystallization method, a thermal crystallization method using RTA, a furnace anneal, or the like, or a thermal crystallization method using a catalyst like nickel can be used. The material of the crystalline semiconductor film is not limited; however, silicon, a silicon germanium alloy, or the like is preferably used.

Next, an extremely thin oxide film with a thickness of approximately 2 nm is formed on a surface of the semiconductor layer with ozone water. Then, a small amount of impurity element (such as boron or phosphorus) is added to control a threshold voltage of a TFT. In this embodiment mode, an ion doping method is employed in which diborane ($B_2H_6$) is not separated by mass but excited by plasma under conditions where the acceleration voltage is set 15 kV, the gas contains diborane diluted with hydrogen to be 1 vol %, the gas flow rate is 30 sccm, and the dose is $2\times10^{12}/cm^2$, so that boron is added into the amorphous silicon film.

Next, the extremely thin oxide film on the surface is removed, and a thin oxide film is formed again. Then, a mask made of resist is formed using a first photomask, and etching treatment is performed to form a semiconductor layer isolated in a desired island shape. At this stage, the thickness of the semiconductor layer is set so as to be in a range of 25 to 80 nm (preferably 30 to 70 nm).

Next, the oxide film is removed with etchant including hydrofluoric acid, and at the same time the surface of the silicon film is washed. Then, an insulating film containing silicon as its main component is formed as a gate insulating film 812. Here, a silicon oxynitride film (composition ratio Si:O:N:H=32:59:7:2) is formed at a thickness of 115 nm by a plasma CVD method.

Next, a first conductive film with a thickness of 20 to 100 nm and a second conductive film with a thickness of 100 to 400 nm are stacked over the gate insulating film 812. In this embodiment mode, a tantalum nitride film with a thickness of 50 nm and a tungsten film with a thickness of 370 nm are sequentially stacked over the gate insulating film. As conductive materials to form the first and second conductive films, an element selected from Ta, W, Ti, Mo, Al, or Cu or an alloy or compound containing the above element as its main component is used.

Next, a resist mask is formed using a second photomask, and etching is performed by a dry etching method or a wet etching method. By this etching step, the conductive films are etched, thereby obtaining conductive layers 814a, 814b, 815a, and 815b. In this embodiment mode, an ICP (Inductively Coupled Plasma) etching method is used and the films are etched once or plural times into a desired tapered shape by appropriately adjusting the etching conditions (such as the amount of electric power applied to a coil-shaped electrode, the amount of electric power applied to an electrode over the substrate side, and the electrode temperature over the substrate side). As an etching gas, a chlorine-based gas typified by $Cl_2$, $BCl_3$, $SiCl_4$, or $CCl_4$; fluorine-based gas typified by $CF_4$, $SF_6$, or $NF_3$; or $O_2$ can be appropriately used. An angle of a tapered portion of the conductive layer 814a ranges from 15 to 45°, and that of the conductive layer 814b ranges from 60 to 89°.

The conductive layers 814a and 814b are to be a gate electrode of a TFT, while the conductive layers 815a and 815b are to be a terminal electrode.

Next, after removing the resist mask, a resist mask is newly formed using a third photomask. Then, a first doping step is performed to dope the semiconductor with an impurity element imparting n-type conductivity (typically phosphorus or arsenic) at low concentration, in order to form an n-channel TFT not shown here. The region to be a p-channel TFT and a vicinity of the conductive layers are covered with the resist mask. The first doping step is performed through the insulating film to form a low-concentration impurity region. An individual light-emitting element is driven by using a plurality of TFTs; however, the doping step is not particularly necessary when the light-emitting element is driven only by using a p-channel TFT.

Next, after removing the resist mask, a resist mask is newly formed using a fourth photomask. Then, a second doping step is performed to dope the semiconductor with an impurity element imparting p-type conductivity (typically boron) at high concentration. The second doping step is performed through the gate insulating film 812, so that p-type high-concentration impurity regions 817 and 818 are formed and a channel formation region 819 is defined.

Next, a resist mask is newly formed using a fifth photomask. In order to form an n-channel TFT not shown here, a third doping step is performed to dope the semiconductor with an impurity element imparting n-type conductivity (typically phosphorus or arsenic) at high concentration. The conditions of an ion doping method in the third doping step are that the dose is in the range of $1\times10^{13}$ to $5\times10^{15}/cm^2$ and the acceleration voltage is in the range of 60 to 100 kV The region to be a p-channel TFT and a vicinity of the conductive layers are covered with the resist mask. The third doping step is performed through the gate insulating film 812 to form an n-type high-concentration impurity region.

After that, the resist mask is removed and an insulating film 813 containing hydrogen is formed. Then, activation of the impurity elements added in the semiconductor layer and hydrogenation are performed. The insulating film 813 containing hydrogen is formed using a silicon nitride oxide film ($SiN_xO_y$: x>y>0) obtained by a PCVD method. The activation of the impurity elements and the hydrogenation are performed by a heat treatment, high-intensity light irradiation, or laser beam irradiation. By this treatment, at the same time, it is possible to recover plasma damage to the gate insulating film and plasma damage to an interface between the gate insulating film and the semiconductor layer. In particular, it is very effective to activate the impurity elements by irradiating with the second harmonic of a YAG laser from a top side or a rear side of the substrate in an atmosphere at a room temperature to 300° C. A YAG laser is a preferable activation means because the maintenance is not necessarily carried out frequently. When the laser annealing method is used, the method shown in the embodiment modes of the present invention is preferably employed. The insulating film 813 containing hydrogen is a first layer of the interlayer insulating film, and contains silicon oxide.

Next, a high heat resistant planarizing film 816 is formed as a second layer of the interlayer insulating film. As the high heat resistant planarizing film 816, an insulating film whose skeleton structure includes a bond between silicon (Si) and oxygen (O) obtained by a coating method is used. In this embodiment mode, by using the spin coating apparatus, a coating material solution in which siloxane polymer is dissolved in a solvent ((propylene glycol monomethyl ether (molecular formula: $CH_3OCH_2CH(OH)CH_3$)) is dropped from a nozzle onto the substrate, while the rotation rate of the substrate is gradually increased from 0 rpm to 1,000 rpm, so that the coating material solution is spread uniformly by centrifugal force. In the spin coating apparatus, the substrate is stored horizontally in a coating cup, and the coating apparatus includes a mechanism for rotating the whole coating cup and a mechanism for pressure-controlling an atmosphere inside the coating cup. Then, an edge removing process is performed by an edge remover equipped in the coating apparatus. Subsequently, pre-bake is performed at a temperature of 110° C. for 170 seconds. Next, the substrate is taken out from the spin coating apparatus and cooled. After that, baking is performed at a temperature of 270° C. for one hour. Thus, the high heat resistant planarizing film 816 with a thickness of 0.8 μm is formed.

Depending on the structure of siloxane, siloxane can be classified into, for example, silica glass, alkylsiloxane polymer, alkylsilsesquioxane polymer, silsesquioxane hydride polymer, alkylsilsesquioxane hydride polymer, and the like. As an example of siloxane polymer, PSB-K1 or PSB-K31, which is a coating insulating film material manufactured by Toray Industries, Inc., or ZRS-5PH, which is a coating insulating film material manufactured by Catalysts & Chemicals Industries Co., Ltd., can be given.

Next, heat treatment is performed at 250 to 410° C. for one hour in order to dewater the high heat resistant planarizing film 816. Note that this heat treatment may serve as both the activation of the impurity element added in the semiconductor layer and the hydrogenation. Further, a silicon nitride oxide film ($SiN_xO_y$ (x>y>0): film thickness of 100 to 200 nm) obtained by a PCVD method may be formed as a third interlayer insulating film over the high heat resistant planarizing film 816. When the third interlayer insulating film is formed, the third layer is preferably removed selectively by using a wiring 822 or a first electrode to be formed later as a mask.

Next, a contact hole is formed in the high heat resistant planarizing film 816 using a sixth mask. At the same time, the high heat resistant planarizing film 816 in the periphery portion of the substrate is removed. Here, etching (wet etching or dry etching) is performed under the conditions that the high selection ratio of the heat resistant planarizing film 816 to the insulating film 813 can be realized. The etching gas to be used is not limited; however, $CF_4$, $O_2$, He, Ar, or the like is appropriate here.

Next, etching is performed by using the sixth mask continuously, so that the exposed gate insulating film 812 and insulating film 813 are selectively removed. The etching treatment is performed to the gate insulating film 812 and the insulating film 813 by using a mixed gas of $CHF_3$ and Ar as the etching gas. In order to perform etching so that residue is not left over the semiconductor layer, the etching time is preferably increased by approximately 10 to 20%.

Next, the sixth mask is removed, and a conductive film (a conductive film formed by stacking a Ti film, an Al film, and a Ti film in this order, or a conductive film formed by stacking a Mo film, an Al film, and an Mo film in this order) is formed. Then, etching is performed by using a seventh mask to form the wiring 822.

Next, a first electrode 823, that is, an anode (or a cathode) of an organic light-emitting element is formed. As a material of the first electrode 823, an element selected from Ti, titanium nitride, $TiSi_xN_y$, Ni, W, tungsten silicide, tungsten nitride, $WSi_xN_y$, NbN, Cr, Pt, Zn, Sn, In, or Mo; an alloy or a compound containing the element as its main component; or a film or a stacked layer film containing the alloy or the compound as its main component may be used with a total thickness of 100 to 800 nm.

When light is extracted by setting the substrate 810 side as the display surface, ITSO (ITO (indium tin oxide) containing silicon oxide) is used as the material of the first electrode. Since ITSO is not crystallized by heat treatment, ITSO has high planarity and treatment for removing a projection by washing or polishing is not particularly necessary. Therefore, ITSO is preferably used as the material of the first electrode. In addition to ITSO, a light-transmitting conductive film such as a light-transmitting oxide conductive film in which zinc oxide (ZnO) is mixed at 2 to 20 wt % in indium oxide containing silicon oxide may be used. Moreover, a transparent conductive film of ZnO containing Ga (also referred to as GZO) may be used.

Next, an insulator 829 for covering an end portion of the first electrode 823 (referred to as a partition wall, a barrier wall, or the like) is formed. As the insulator 829, an organic resin film obtained by a coating method, or an SOG (Spin on Glass) film (e.g. a $SiO_x$ film containing an alkyl group) is formed at a thickness of 0.8 to 1 μm.

Next, a hole-injecting layer 824H which is a layer including an organic compound, is formed by an evaporation method or a coating method. Note that it is preferable to degas the substrate by performing vacuum heating to the substrate before formation of the hole-injecting layer 824H in order to increase the reliability. For example, before evaporating an organic compound material, heat treatment at 200 to 400° C. is preferably performed in a low-pressure atmosphere or an inert atmosphere in order to remove gas contained in the substrate. In this embodiment mode, since the interlayer insulating film is formed using a silicon oxide film having high heat resistance, the film can resist a heat treatment at high temperature.

When the layer including an organic compound is formed by a coating method using spin coating, it is preferable to bake the organic compound layer by vacuum heating after the solution containing the organic compound is applied using a coating method. For example, after applying an aqueous solution of poly(ethylene dioxythiophene) and poly(styrene sulfone acid) (referred to as PEDOT and PSS, respectively) which serves as the hole-injecting layer 824H on the whole surface, baking is performed.

The hole-injecting layer 824H may also be formed by an evaporation method. For example, a metal oxide such as molybdenum oxide and α-NPD, or the metal oxide and rubrene can be co-evaporated to form the hole-injecting layer 824H, whereby a hole-injecting property can be increased.

Next, a light-emitting layers 824 and an electron-transporting layer 824E, which are the layers including an organic compound, are formed by an evaporation method in a film formation chamber which is evacuated so as to have a degree of vacuum at less than or equal to 0.665 Pa, preferably in the range of $0.133 \times 10^{-1}$ to $10^{-3}$ Torr. At the evaporation, the organic compound is vaporized by resistance heating, and the vaporized organic compound spatters toward the substrate by opening the shutter. The vaporized organic compound spatters upward and passes through an opening portion provided in a metal mask, and then is deposited over the substrate. Note that the light-emitting layer 824 and the electron-transporting layer 824E may be formed by a coating method. In this embodiment mode, $Alq_3$ is formed at a thickness of 40 nm as the electron-transporting layer 824E.

In this embodiment mode, a light-emitting layer showing white light emission is formed, and the color filter according to the present invention or both the color filter according to the present invention and a color conversion layer and the like are provided separately, whereby full color display is performed. As the colored layer of the color filter used for an EL light-emitting device, a colored layer with a low content rate of a pigment is preferably used so that the large amount of light can be transmitted through the color filter. Further, the formation of the colored layer as a thin layer enables increase in the amount of light that transmits through the color filter. Unlike a colored layer used for the liquid crystal display device, the color layer used for the EL light-emitting device does not need to have a sharp absorption peak, but the colored layer with a broad absorption peak is preferably used. A black pigment may be included in the colored layer, whereby outside light entering from the exterior of the EL light-emitting device can be absorbed and a problem in that an observer is reflected in a cathode can be suppressed.

Next, a second electrode 825, that is, a cathode (or an anode) of the organic light-emitting element is formed. As the material of the second electrode 825, an alloy such as MgAg, MgIn, AlLi, $CaF_2$, or $Ca_3N_2$ or a film formed by co-evaporating aluminum and an element belonging to the first or second group in the periodic table may be used. When the second electrode 825 has a light-transmitting property, a light-transmitting conductive film may be formed as the second electrode 825.

Before formation of the second electrode 825, a layer formed of $CaF_2$, $MgF_2$, or $BaF_2$ (with a thickness of 1 to 5 nm) may be formed as a cathode buffer layer.

Moreover, a protective layer (a thin film containing silicon nitride or carbon as its main component) for protecting the second electrode 825 may be formed.

Next, a sealing substrate 833 is attached with a sealant 828 to seal the light-emitting element. In this embodiment mode, the color filter manufactured in Embodiment Mode 1 is used as the sealing substrate 833. The sealing substrate 833 is attached so that the sealant 828 covers an end portion (tapered portion) of the high heat resistant planarizing film 816. A region surrounded by the sealant 828 may be filled with a transparent filling material 827. As the filling material 827, a material is not particularly limited as long as the material has a light-transmitting property, and typically an ultraviolet-light curing or a thermosetting epoxy resin is preferably used. A drying agent may be included in the filling material 827. Here, a high heat resistant UV epoxy resin (2500 Clear, manufactured by Electrolight Co., Ltd) is used which has a refractive index of 1.50, a viscosity of 500 cps, a shore D hardness of 90, a tensile intensity of 3,000 psi, a $T_g$ of 150° C., a volume resistance of $1 \times 10^{15}$ $\Omega \cdot cm$, and a withstanding voltage of 450 V/mil. By filling the space between the pair of substrates with the filling material 827, the transmissivity of the whole can be increased.

Further, after patterning the sealant 828 on the scaling substrate 833 under an inert gas atmosphere or low pressure by a droplet discharging method, the filling material 827 may be applied within the seal pattern using an ink-jet apparatus or a dispenser apparatus, which is followed by attaching the pair of substrates to each other under a reduced pressure so that entry of an air bubble to the space between the pair of substrates can be avoided. At the same time as the attachment of the substrates, the sealant 828 may be cured under low pressure by performing ultraviolet-light irradiation or heat treatment. In addition to the ultraviolet-light irradiation, heat treatment may be performed.

A region surrounded by the sealant 828 may be filled with dry inert gas. When the region is filled with gas, it is preferable that a part of the sealing substrate 833 be ground to form a depressed portion, and then a drying agent be disposed in the depressed portion.

Finally, an FPC (flexible print circuit) 832 is attached to the conductive layers 815a and 815b used as a terminal electrode with an anisotropic conductive film 831. The conductive layers 815a and 815b are formed at the same time as the gate wiring (see FIG. 4A). When the first electrode 823 is formed, a light-transmitting conductive film may be formed over the conductive layers 815a and 815b.

A top view of the light-emitting device is shown in FIG. 4B. As shown in FIG. 4B, an end portion 834 of the high heat resistant planarizing film is covered with the sealant 828.

An active matrix light-emitting device manufactured thus has the high heat resistant planarizing film 816 as an interlayer insulating film which typically has a bond between silicon (Si) and oxygen (O) as a skeleton structure, in a TFT, and also includes silicon oxide in the first electrode. The reliability of the active matrix light-emitting device is increased by using a thermally stable material containing silicon oxide as the composition material.

In this embodiment mode, the first electrode is formed of a metal and the second electrode is formed of a light-transmitting material. Further, the structure in which light is extracted through the sealing substrate 833, that is, a top emission structure is employed. The embodiment modes of the present invention are not limited thereto. The first electrode can be formed of a light-transmitting material and the second electrode can be formed of a metal. The structure in which light is extracted through the substrate 810, that is, a bottom emission structure may also be employed. If both of the first electrode and the second electrode are formed of a light-transmitting material, a structure in which light is extracted through both of the substrate 810 and the sealing substrate 833 can be employed. The present invention may employ any one of the structures appropriately.

In the light-emitting device according to the present invention, a driving method of screen display is not particularly limited. For example, a dot sequential driving method, a line sequential driving method, an area sequential driving method, or the like may be used. Typically, the line sequential driving method is used, and a time division gray scale driving method or an area gray scale driving method may be used as appropriate. Further, a video signal to be inputted into a source line of the light-emitting device may be either an analog signal or a digital signal. A driver circuit and the like may be designed appropriately in accordance with the video signal.

In a light-emitting device in which a video signal is digital, the video signal can be inputted into a pixel at either constant voltage (CV) or constant current (CC). When the video signal uses the constant voltage (CV), the voltage applied to the light-emitting element may be constant (CVCV) or the current flowing through the light-emitting element may be constant (CVCC). On the other hand, when the video signal is inputted at a constant current (CC), the voltage applied to the light-emitting element may be constant (CCCV) or the current flowing through the light-emitting element may be constant (CCCC).

In the light-emitting device according to the present invention, a protective circuit for preventing electrostatic breakdown (such as a protective diode) may be provided.

The present invention can be applied regardless of the TFT structure. For example, a top-gate TFT, a bottom-gate (inverted staggered) TFT, or a staggered TFT can be used. Not only a TFT having a single-gate structure but also a multi-gate TFT having a plurality of channel formation regions, for example, a double-gate TFT, may be used.

In order to enhance contrast, a polarizing plate or a circular polarizing plate may be provided. For example, a polarizing plate or a circular polarizing plate can be provided over one surface or both surfaces of the display device.

The color filter is manufactured by the manufacturing method of the present invention, whereby color mixing can be corrected easily and efficiently compared to the conventional method for correcting color mixing, and processing time can be drastically reduced. Further, only the color filter material which is unnecessary in the color-mixed portion is selectively removed; therefore the waste of the color filter material can be eliminated. Moreover, it is not necessary to fill the color filter material again to the portion which is subjected to the correction method. Therefore, the manufacturing step can be simplified, which contributes to the reduction of the cost of the display device.

Embodiment Mode 4

Figure 5:
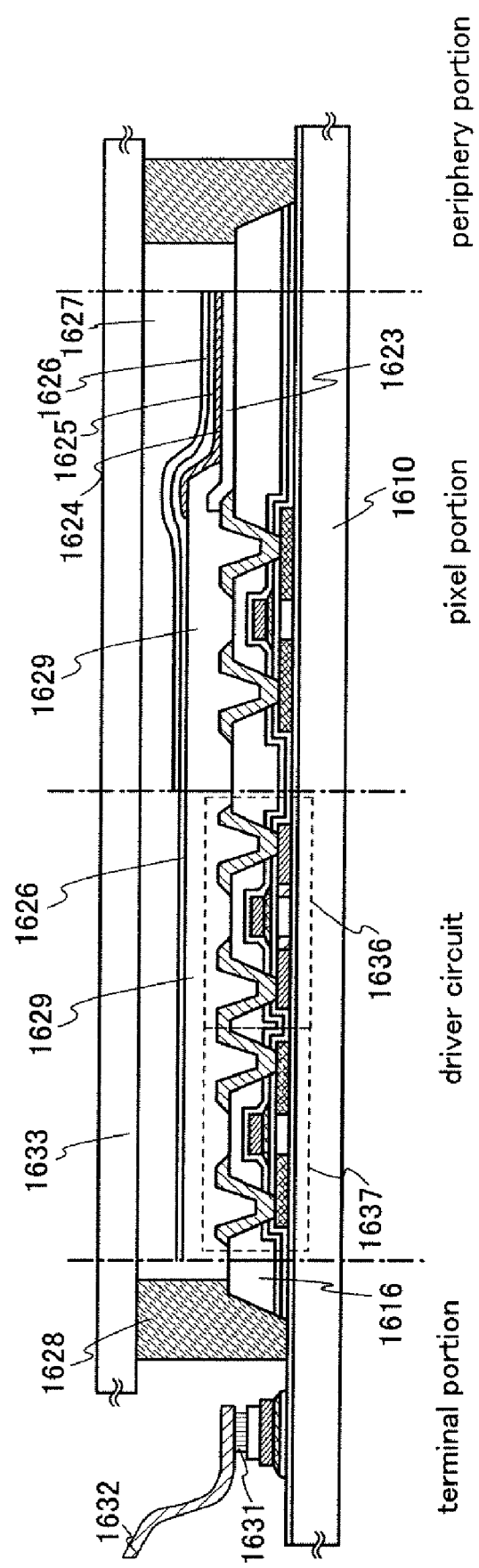
FIG. 5 is a cross sectional view of an EL display device.

Embodiment Mode 3 describes only the pixel portion and the terminal portion of the display device with reference to the drawing. Meanwhile, this embodiment mode will describe an example of forming a pixel portion, a driver circuit, and a terminal portion of the display device over the same substrate with reference to FIG. 5.

After formation of a base insulating film over a substrate 1610, each semiconductor layer is formed. Then, after formation of a gate insulating film for covering the semiconductor layer; each gate electrode and terminal electrode are formed. Next, in order to form an n-channel TFT 1636, the semiconductor is doped with an impurity element imparting n-type conductivity (e.g. phosphorus or arsenic). In order to form a p-channel TFT 1637, the semiconductor is doped with an impurity element imparting p-type conductivity (e.g. boron), so that a source region and a drain region, and if necessary, an LDD region are appropriately formed.

Next, a high heat resistant planarizing film 1616 is formed as an interlayer insulating film. As the high heat resistant planarizing film 1616, an insulating film whose skeleton structure is formed of a bond of silicon (Si) and oxygen (O) obtained by a coating method is used. A hydrogen-containing $SiN_xO_y$ film (x>y>0) may be provided over the high heat resistant planarizing film 1616.

Next, a contact hole is formed in a $SiN_xO_y$ film (x>y>0) containing hydrogen and the high heat resistant planarizing film by using a mask. At the same time, the high heat resistant planarizing film over the edge portion of the substrate is removed. The $SiN_xO_y$ film (x>y>0) and the high heat resistant planarizing film may have a taper shape by performing etching once or plural times.

Next, etching is performed by using the high heat resistant planarizing film 1616 as a mask to selectively remove the exposed $SiN\_O_y$ film containing hydrogen or the exposed gate insulating film.

Next, after forming a conductive film, etching is performed using a mask, thereby forming a drain wiring and a source wiring.

Next, a first electrode 1623 formed of a transparent conductive film, that is, an anode (or cathode) of an organic light-emitting element is formed. At the same time, a transparent conductive film is also formed over the terminal electrode.

In the following steps, an insulator 1629, a layer 1624 including an organic compound, a second electrode 1625 formed of a conductive film, and a transparent protective layer 1626 are formed and then a sealing substrate 1633 is attached with a sealing material 1628 to seal the light-emitting element. In this embodiment mode, the color filter manufactured in Embodiment Mode 1 is used as the sealing substrate 1633. Note that a region surrounded by the sealing material 1628 is filled with a transparent filling material 1627. Finally, an FPC 1632 is attached to the terminal electrode by a known method with the use of an anisotropic conductive film 1631. The terminal electrode is preferably formed by stacking a transparent conductive film over an electrode formed at the same time as the gate wiring.

By the above steps, the pixel portion, the driver circuit, and the terminal portion are formed over the same substrate. Since an n-channel TFT and a p-channel TFT can be manufactured over the same substrate by a manufacturing method in this embodiment mode, the driver circuit and the protective circuit can be manufactured over the same substrate, thereby reducing the number of mounted components such as an IC (Integrated Circuit) chip for driving.

The light-emitting device of the present invention is not limited to the mode of manufacturing the n-channel TFT and the p-channel TFT over the same substrate. The pixel portion and the driver circuit may be formed using only the n-channel TFT or only the p-channel TFT to reduce the number of steps.

The color filter without color mixing can be manufactured efficiently and easily by the method for correcting the color filter according to the present invention. Further, only the color filter material which is unnecessary in the color-mixed portion can be selectively removed; therefore the waste of the color filter material can be eliminated. Accordingly, the use of the color filter of the present invention allows the production of the display device without display unevenness at low costs.

Embodiment Mode 5

As electronic appliances including the color filter according to the present invention, video cameras, digital cameras, goggle-type displays (head mounted displays), navigation systems, audio reproducing devices (such as car audio components or audio components), notebook personal computers, game machines, mobile information terminals (mobile computers, cellular phones, mobile game machines, electronic books, and the like), image reproducing devices provided with a recording medium (specifically, devices provided with a display which can reproduce a recording medium such as a Digital Versatile Disk (DVD) and can display the image), and the like can be given. FIGS. 8A to 8D and FIG. 9 show specific examples of these electronic appliances.

Figure 8A:
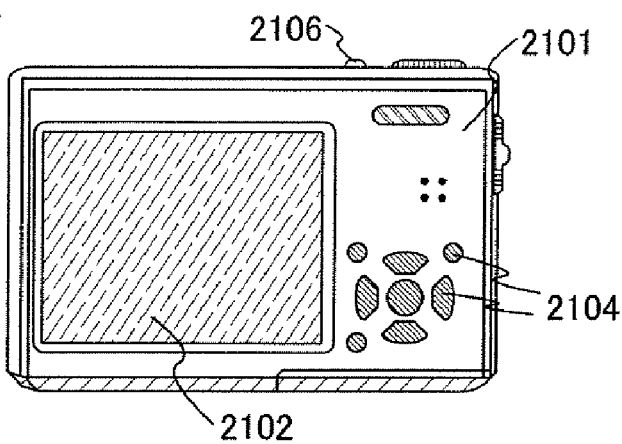
FIGS. 8A to 8D each show an example of an electronic appliance.

FIG. 5A shows a digital camera, which includes a main body 2101, a display portion 2102, an imaging portion, operation keys 2104, a shutter button 2106, and the like. Note that FIG. 8A shows the digital camera observed from the display portion 2102 side, and the imaging portion is not shown in FIG. 8A. The color filter according to the present invention is used for the display portion 2102. The yield in the step of manufacturing the color filter is improved, and the inexpensive digital camera with few display defects can be realized by the present invention.

Figure 8B:
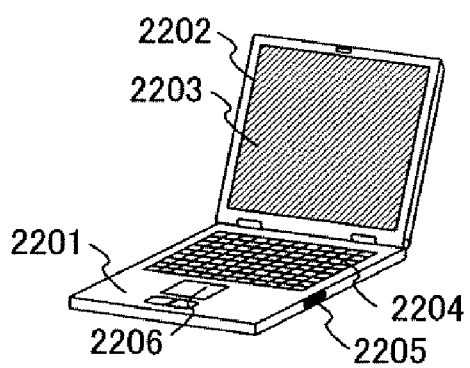

FIG. 8B shows a notebook personal computer, which includes a main body 2201, a housing 2202, a display portion 2203, a keyboard 2204, an external connection port 2205, a pointing device 2206, and the like. The color filter according to the present invention is used for the display portion 2203. The yield in the step of manufacturing the color filter is improved, and the inexpensive notebook personal computer with few display defects can be realized by the present invention.

Figure 8C:
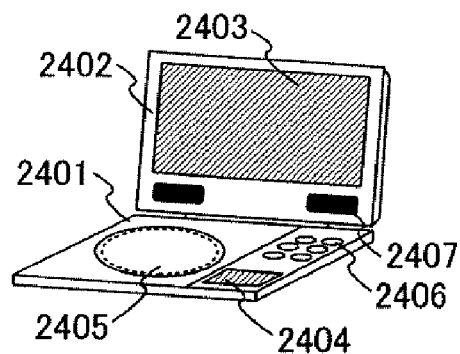

FIG. 8C shows a portable image reproducing device provided with a recording medium (specifically, a DVD reproducing device), which includes a main body 2401, a housing 2402, a first display portion 2403, a second display portion 2404, a recording medium (such as a DVD) reading portion 2405, operation keys 2406, a speaker portion 2407, and the like. The first display portion 2403 mainly displays image information and the second display portion 2404 mainly displays character information. The category of such an image reproducing device provided with a recording medium includes a home game machine and the like. The color filter according to the present invention is used for the first display portion 2403 or the second display portion 2404, and also can be used for both the first display portion 2403 and the second display portion 2404. The yield in the step of manufacturing the color filter is improved, and the inexpensive image reproducing device with few display defects can be realized by the present invention.

Figure 8D:
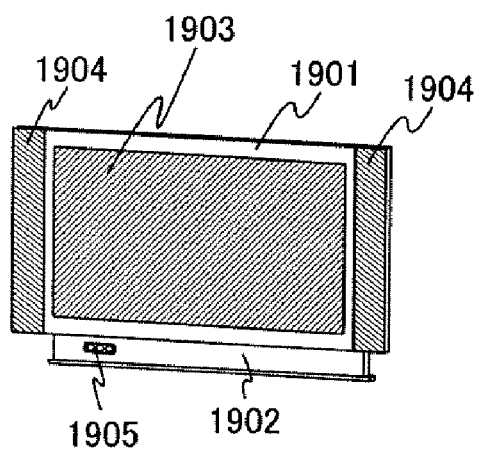

FIG. 8D shows a display device, which includes a housing 1901, a support base 1902, a display portion 1903, speakers 1904, a video input terminal 1905, and the like. This display device is manufactured by using a thin film transistor formed by a manufacturing method described in the above embodiment mode for the display portion 1903 and a driver circuit. Note that liquid crystal display devices, light emitting devices, and the like are given as examples of display devices. Specifically, all types of display devices for displaying information are included, for example, display devices for computers, display devices for receiving television broadcasting, and display devices for advertisement. The yield in the step of manufacturing the color filter is improved, and an inexpensive display device with few display defects, especially, a large-sized display device having a large screen of 22 to 50 inches can be realized by the present invention.

Figure 9:
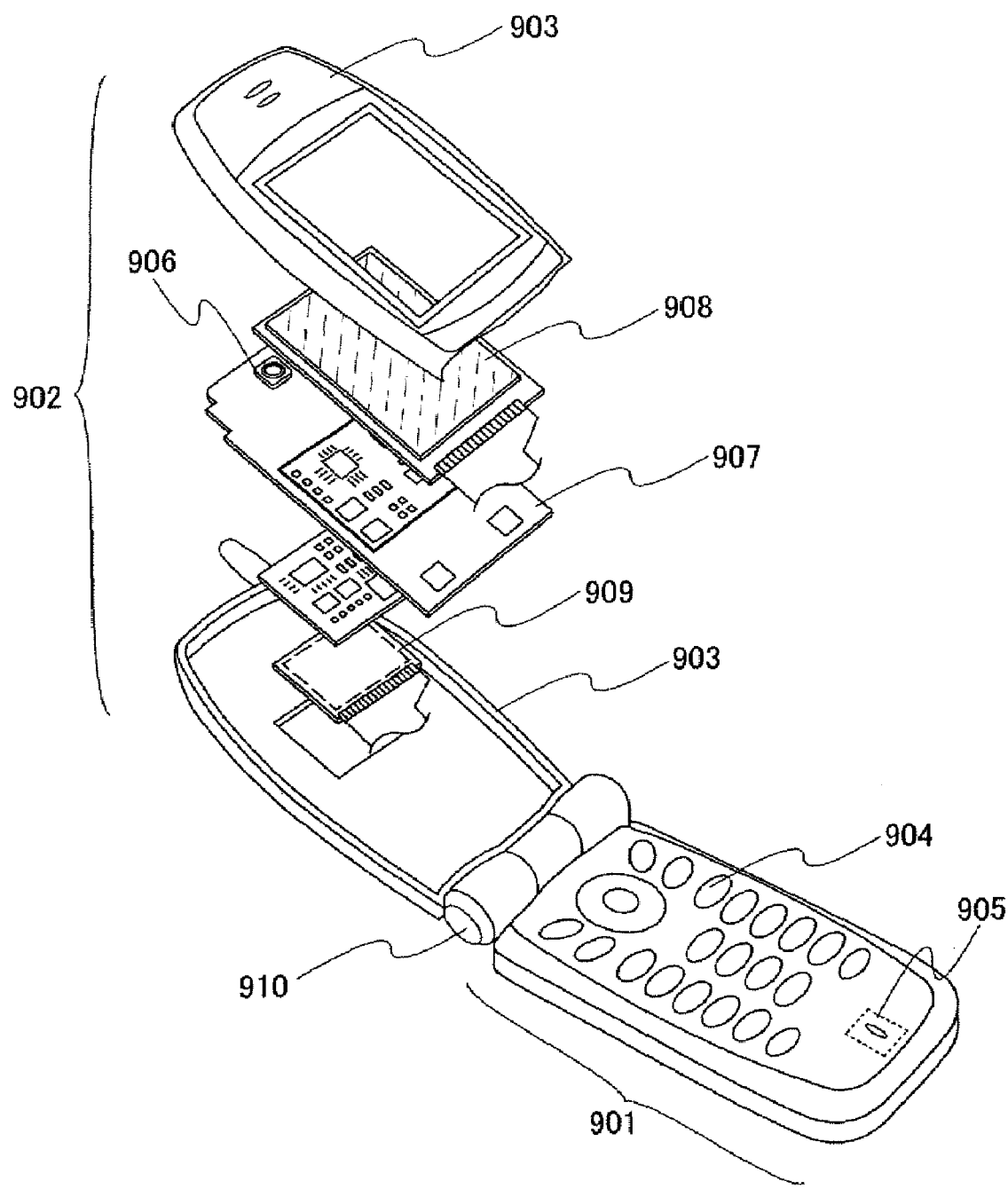
FIG. 9 shows an example of an electronic appliance.

In the cellular phone shown in FIG. 9, a main body (A) 901 provided with operation switches 904, a microphone 905, and the like is connected with a hinge 910 to a main body (B) 902 provided with a display panel (A) 908, a display panel (B) 909, a speaker 906, and the like, such that the cellular phone can be opened and closed. The display panel (A) 908 and the display panel (B) 909 are placed in a housing 903 of the main body (B) 902 together with a circuit substrate 907. Pixel portions of the display panel (A) 908 and the display panel (B) 909 are arranged such that they are visible through an opening formed in the housing 903. The color filter according to the present invention is used for the display panel (A) 908 and the display panel (B) 909.

As for the display panel (A) 908 and the display panel (B) 909, the specifications such as the number of pixels can be appropriately determined in accordance with the functions of the cellular phone. For example, the display panel (A) 908 and the display panel (B) 909 can be combined such that the display panel (A) 908 works as a main screen and the display panel (B) 909 works as a subscreen.

The yield in the step of manufacturing the color filter is improved, and the inexpensive cellular phone with few display defects can be realized by the present invention.

The cellular phone according to this embodiment mode can be changed into various modes depending on functions or applications thereof. For example, it may be a camera-equipped cellular phone by incorporating an imaging element in the hinge 910. Even when the operation switches 904, the display panel (A) 908, and the display panel (B) 909 are placed in one housing, the above-described operation effect can be obtained. Further, a similar effect can be obtained even when the structure of this embodiment mode is applied to an information display terminal equipped with a plurality of display portions.

As described above, the display device using the color filter according to the present invention is used as the display portions shown in FIGS. 8A to 8D or the display panels shown in FIG. 9, whereby various electronic appliances can be produced.

Embodiment 1

In this embodiment, a color-mixed portion was formed over a substrate, and the color-mixed portion was corrected by irradiating with a laser beam with a wavelength of 532 nm. Experiment results thereof will be explained with reference to FIGS. 7A to 7C.

A glass substrate was coated with a green color filter material (CG-7001 manufactured by FUJIFILM Corporation) by a spin coating method, and then pre-bake was performed for 120 seconds at 90° C. After that, post-bake was performed for one hour at 220° C., so that a colored layer (G) was formed. Then, the colored layer (G) was coated with a red color filter material (CR-7001 manufactured by FUJIFILM Corporation) by a spin coating method, and then pre-bake was performed for 120 seconds at 90° C. After that, post-bake was performed for one hour at 220° C., so that a colored layer (R) was formed over the colored layer (G). Thus, this sample has a color-mixed portion which is formed by the overlapping of the red color filter material over the colored layer (G).

Next, the surface of the substrate over which the colored layer (G) and the colored layer (R) were formed was irradiated with a laser beam. As a laser irradiation device, a solid laser (a pulse excitation Q switch Nd:YAG (Yttrium Aluminum Garnet) laser) of a Laser Micro Cutter LR-2100ST (manufactured by HOYA Corporation) was used, and a second harmonic (532 nm) of a fundamental wave was used. The maximum output energy of the laser light source of this laser irradiation device is 2 mJ for the second harmonic. Also, this laser irradiation device marks energy emitted through an optical system on a scale of 1 to 200. A scale value of 200 is the maximum value of irradiation energy given to an object to be irradiated, and a scale value of 1 is the minimum value. In this specification, numerical value of this scale is called energy intensity. Note that the laser beam with a wavelength of 532 nm has higher transmissivity to the colored layer (G) than to the colored layer (R) (see FIG. 6). It is found from FIG. 6 that the transmissivity of the laser beam with a wavelength of 532 nm to the colored layer (R) is approximately 3%, and the transmissivity of the laser beam with a wavelength of 532 nm to the colored layer (G) is approximately 70%.

When the sample in which the colored layer (R) was formed over the colored layer (G) was continuously irradiated with a laser beam with energy intensity of greater than or equal to 50 and less than or equal to 90, the colored layer (R) was removed without the colored layer (R) left and without both the colored layers (R) and (G) removed. Accordingly, the color filter material which is unnecessary in the color-mixed portion can be selectively removed, and the step of filling again the color filter material into the portion which is subjected to the laser irradiation can be omitted with the use of the method for manufacturing the color filter according to the present invention.

The sample in which the colored layer (R) was formed over the colored layer (G) was continuously irradiated with the laser beam. FIG. 7A shows an optical photomicrograph of the sample irradiated with the laser beam. It is found from FIG. 7A that, in the region irradiated with the second harmonic of a YAG laser, a colored layer (R) 702 was selectively removed with a colored layer (G) 701 of a bottom layer remaining.

Similarly, the colored layer (G) was formed over a glass substrate, and then the colored layer (G) was coated with a blue color filter material (CB-7001 manufactured by FUJIFILM Corporation) by a spin coating method. Pre-bake was performed for 120 seconds at 90° C. After that, post-bake was performed for one hour at 220° C., so that a colored layer (B) was formed. Thus, a sample having the color-mixed portion was manufactured. Further, the colored layer (B) was formed over a glass substrate and the colored layer (R) was formed thereover by a similar method to manufacture a sample having the color-mixed portion.

Correction of the color-mixed portion was carried out for each sample by irradiating with the second harmonic of a YAG laser (532 nm) from the surface of the substrate. Note that the laser beam with a wavelength of 532 nm has higher transmissivity to the colored layer (G) than that to the colored layer (B), and has higher transmissivity to the colored layer (B) than that to the colored layer (R) (see FIG. 6). It is found from FIG. 6 that the transmissivity of the laser beam with a wavelength of 532 nm to the colored layer (B) is approximately 15%.

When the sample in which the colored layer (B) is formed over the colored layer (G) was continuously irradiated with a laser beam with energy intensity of greater than or equal to 40 and less than or equal to 90, the colored layer (B) was selectively removed without the colored layer (B) left and without both the colored layers (B) and (G) removed. Accordingly, the color filter material which is unnecessary in the color-mixed portion can be selectively removed, and the step of filling again the color filter material to the portion which was laser-irradiated can be omitted with the use of the method for manufacturing the color filter according to the present invention.

The sample in which the colored layer (B) was formed over the colored layer (G) was continuously irradiated with the laser beam. FIG. 7B shows an optical photomicrograph of the sample irradiated with the laser beam. It is found from FIG. 7B that, in the region irradiated with the second harmonic of a YAG laser, a colored layer (B) 704 was selectively removed with a colored layer (G) 703 of a bottom layer remaining.

When the sample in which the colored layer (B) was formed over the colored layer (R) was continuously irradiated with a laser beam with energy intensity of greater than or equal to 40 and less than or equal to 50, the colored layer (R) was removed without the colored layer (R) left and without both the colored layers (B) and (R) removed. Accordingly, the color filter material which is unnecessary in the color-mixed portion can be selectively removed, and the step of filling again the color filter material to the portion which was irradiated with the laser beam can be omitted with the use of the method for manufacturing the color filter according to the present invention.

The sample in which the colored layer (R) was formed over the colored layer (B) was continuously irradiated with the laser beam. FIG. 7C shows an optical photomicrograph of the sample irradiated with the laser beam. It is found from FIG. 7C that, in the region irradiated with the second harmonic of a YAG laser, a colored layer (R) 706 was selectively removed with a colored layer (B) 705 of a bottom layer remaining.

From the results described above, it was proved that, by irradiating the color-mixed portion with a laser beam of which transmissivity to each color filter material is different, only the color filter material to which the laser beam has lower transmissivity can be selectively removed. This application is based on Japanese Patent Application serial no. 2007-017952 filed with Japan Patent Office on January 29, in 2007, the entire contents of which are hereby incorporated by reference.

What is claimed is:

1. A method of correcting a defect portion of a color filter wherein a second color filter material overlaps a first color filter material in the defect portion, the method comprising
    removing the second color filter material selectively by irradiating the defect portion of the color filter with a laser beam,
    wherein the first color filter material and the second color filter material are different in color, and
    wherein a wavelength of the laser beam is arranged to allow the laser beam to be absorbed by the second color filter material more efficiently than the first color filter material.

2. The method of correcting a defect portion of a color filter according to claim 1,
    wherein the defect portion is formed by dropping the second color filter material over the first color filter material by an ink-jet method.

3. The method of correcting a defect portion of a color filter according to claim 1,
    wherein the first color filter material transmits green light more selectively than blue light and red light,
    wherein the second color filter material transmits blue light more selectively than green light and red light, and
    wherein the wavelength of the laser beam is located in a wavelength region from 515 nm to 600 nm.

4. The method of correcting a defect portion of a color filter according to claim 1,
    wherein the first color filter material transmits green light more selectively than blue light and red light,
    wherein the second color filter material transmits red light more selectively than blue light and green light, and
    wherein the wavelength of the laser beam is located in a wavelength region from 470 nm to 585 nm.

5. The method of correcting a defect portion of a color filter according to claim 1,
    wherein the first color filter material transmits red light more selectively than blue light and green light,
    wherein the second color filter material transmits green light more selectively than blue light and red light, and
    wherein the wavelength of the laser beam is located in a wavelength region from 595 nm to 700 nm.

6. The method of correcting a defect portion of a color filter according to claim 1, wherein the first color filter material transmits red light more selectively than blue light and green light, wherein the second color filter material transmits blue light more selectively than green light and red light, and wherein the wavelength of the laser beam is located in a wavelength region from 580 nm to 700 nm.

7. The method of correcting a defect portion of a color filter according to claim 1, wherein the first color filter material transmits blue light more selectively than green light and red light, wherein the second color filter material transmits green light more selectively than blue light and red light, and wherein the wavelength of the laser beam is located in a wavelength region from 400 nm to 500 nm.

8. The method of correcting a defect portion of a color filter according to claim 1, wherein the first color filter material transmits blue light more selectively than green light and red light, wherein the second color filter material transmits red light more selectively than blue light and green light, and wherein the wavelength of the laser beam is located in a wavelength region from 400 nm to 535 nm.

9. A method of correcting a defect portion of a color filter wherein a second color filter material overlaps a first color filter material in the defect portion, the method comprising:

removing the second color filter material selectively by irradiating the defect portion of the color filter with a laser beam, wherein the first color filter material and the second color filter material are different in color, and wherein a wavelength of the laser beam is arranged to have transmissivity to the first color filter material higher than the transmissivity to the second color filter material by greater than or equal to 10%.

10. The method of correcting a defect portion of a color filter according to claim 9, wherein the defect portion is formed by dropping the second color filter material over the first color filter material by an ink-jet method.

11. The method of correcting a defect portion of a color filter according to claim 9, wherein the first color filter material transmits green light more selectively than blue light and red light, wherein the second color filter material transmits blue light more selectively than green light and red light, and wherein the wavelength of the laser beam is located in a wavelength region from 515 nm to 600 nm.

12. The method of correcting a defect portion of a color filter according to claim 9, wherein the first color filter material transmits green light more selectively than blue light and red light, wherein the second color filter material transmits red light more selectively than blue light and green light, and wherein the wavelength of the laser beam is located in a wavelength region from 470 nm to 585 nm.

13. The method of correcting a defect portion of a color filter according to claim 9, wherein the first color filter material transmits red light more selectively than blue light and green light, wherein the second color filter material transmits green light more selectively than blue light and red light, and wherein the wavelength of the laser beam is located in a wavelength region from 595 nm to 700 nm.

14. The method of correcting a defect portion of a color filter according to claim 9, wherein the first color filter material transmits red light more selectively than blue light and green light, wherein the second color filter material transmits blue light more selectively than green light and red light, and wherein the wavelength of the laser beam is located in a wavelength region from 580 nm to 700 nm.

15. The method of correcting a defect portion of a color filter according to claim 9, wherein the first color filter material transmits blue light more selectively than green light and red light, wherein the second color filter material transmits green light more selectively than blue light and red light, and wherein the wavelength of the laser beam is located in a wavelength region from 400 nm to 500 nm.

16. The method of correcting a defect portion of a color filter according to claim 9, wherein the first color filter material transmits blue light more selectively than green light and red light, wherein the second color filter material transmits red light more selectively than blue light and green light, and wherein the wavelength of the laser beam is located in a wavelength region from 400 nm to 535 nm.

17. A method of manufacturing a color filter comprising:

forming a first colored layer having a first color over a substrate;

forming a second colored layer having a second color over the substrate wherein the second color is different from the first color; and correcting a defect portion of the color filter, in which the second colored layer overlaps the first colored layer, by removing the second colored layer from the defect portion by irradiating the defect portion with a laser beam, wherein a wavelength of the laser beam is selected such that the laser beam is absorbed more efficiently by the second colored layer than by the first colored layer.

18. The method of manufacturing a color filter according to claim 17, wherein the formation of the first colored layer and the second colored layer is performed by an ink-jet method.

19. The method of manufacturing a color filter according to claim 17, wherein the first color is green and the second color is blue, and wherein the wavelength of the laser beam is located in a wavelength region from 515 nm to 600 nm.

20. The method of manufacturing a color filter according to claim 17, wherein the first color is green and the second color is red, and wherein the wavelength of the laser beam is located in a wavelength region from 470 nm to 585 nm.

21. The method of manufacturing a color filter according to claim 17, wherein the first color is red and the second color is green, and wherein the wavelength of the laser beam is located in a wavelength region from 595 nm to 700 nm.

22. The method of manufacturing a color filter according to claim 17, wherein the first color is red and the second color is blue, and wherein the wavelength of the laser beam is located in a wavelength region from 580 nm to 700 nm.

23. The method of manufacturing a color filter according to claim 17, wherein the first color is blue and the second color is green, and wherein the wavelength of the laser beam is located in a wavelength region from 400 nm to 500 nm.

24. The method of manufacturing a color filter according to claim 17,
wherein the first color is blue and the second color is red, and
wherein the wavelength of the laser beam is located in a wavelength region from 400 nm to 535 nm.

25. A method of manufacturing a color filter comprising:
forming a first colored layer having a first color over a substrate;
forming a second colored layer having a second color over the substrate wherein the second color is different from the first color; and
correcting a defect portion of the color filter, in which the second colored layer overlaps the first colored layer, by removing the second colored layer from the defect portion by irradiating the defect portion with a laser beam,
wherein a wavelength of the laser beam is selected such that the laser beam has transmissivity to the first colored layer higher than the transmissivity to the second colored layer by greater than or equal to 10%.

26. The method of manufacturing a color filter according to claim 25,
wherein the formation of the first colored layer and the second colored layer is performed by an ink-jet method.

27. The method of manufacturing a color filter according to claim 25,
wherein the first color is green and the second color is blue, and
wherein the wavelength of the laser beam is located in a wavelength region from 515 nm to 600 nm.

28. The method of manufacturing a color filter according to claim 25,
wherein the first color is green and the second color is red, and
wherein the wavelength of the laser beam is located in a wavelength region from 470 nm to 585 nm.

29. The method of manufacturing a color filter according to claim 25,
wherein the first color is red and the second color is green, and
wherein the wavelength of the laser beam is located in a wavelength region from 595 nm to 700 nm.

30. The method of manufacturing a color filter according to claim 25,
wherein the first color is red and the second color is blue, and
wherein the wavelength of the laser beam is located in a wavelength region from 580 nm to 700 nm.

31. The method of manufacturing a color filter according to claim 25,
wherein the first color is blue and the second color is green, and
wherein the wavelength of the laser beam is located in a wavelength region from 400 nm to 500 nm.

32. The method of manufacturing a color filter according to claim 25,
wherein the first color is blue and the second color is red, and
wherein the wavelength of the laser beam is located in a wavelength region from 400 nm to 535 nm.

* * * * *